US012054178B2

(12) United States Patent
Zhang et al.

(10) Patent No.: US 12,054,178 B2
(45) Date of Patent: Aug. 6, 2024

(54) IDENTIFYING RELEVANT OBJECTS WITHIN AN ENVIRONMENT

(71) Applicant: Zoox, Inc., Foster City, CA (US)

(72) Inventors: Linjun Zhang, Canton, MI (US); Marin Kobilarov, Baltimore, MD (US)

(73) Assignee: Zoox, Inc., Foster City, CA (US)

( * ) Notice: Subject to any disclaimer, the term of this patent is extended or adjusted under 35 U.S.C. 154(b) by 171 days.

(21) Appl. No.: 17/550,996

(22) Filed: Dec. 14, 2021

(65) Prior Publication Data

US 2023/0182782 A1 Jun. 15, 2023

(51) Int. Cl.
*B60W 60/00* (2020.01)

(52) U.S. Cl.
CPC ..... *B60W 60/0027* (2020.02); *B60W 2520/10* (2013.01); *B60W 2520/12* (2013.01); *B60W 2554/404* (2020.02); *B60W 2554/4042* (2020.02); *B60W 2554/4043* (2020.02); *B60W 2554/801* (2020.02); *B60W 2554/802* (2020.02); *B60W 2555/60* (2020.02)

(58) Field of Classification Search
CPC ......... B60W 60/0027; B60W 2520/10; B60W 2520/12; B60W 2554/404; B60W 2554/4042; B60W 2554/4043; B60W 2554/801; B60W 2554/802; B60W 2555/60; B60W 50/0097; B60W 60/0011
See application file for complete search history.

(56) References Cited

U.S. PATENT DOCUMENTS

| 2008/0309468 | A1* | 12/2008 | Greene | ................... | G08G 1/166 |
| | | | | | 340/436 |
| 2018/0370528 | A1* | 12/2018 | Rittger | ................... | B60W 30/09 |
| 2019/0084560 | A1 | 3/2019 | Lee | | |
| 2021/0122380 | A1* | 4/2021 | Lan | ................. | B60W 60/00274 |

FOREIGN PATENT DOCUMENTS

| DE | 102018211513 A1 * | 1/2020 |
| KR | 101590787 B1 | 2/2016 |
| KR | 20190004708 A | 1/2019 |
| KR | 102337011 B1 | 12/2021 |

OTHER PUBLICATIONS

Machine translation of DE 102018211513-A1 downloaded from ip.com Nov. 7, 2023 (Year: 2023).*
The PCT Search Report and Written Opinion mailed Mar. 22, 2023 for PCT application No. PCT/US2022/079803, 13 pages.

* cited by examiner

*Primary Examiner* — Peter D Nolan
*Assistant Examiner* — Tanya C Sienko
(74) *Attorney, Agent, or Firm* — Lee & Hayes, P.C.

(57) ABSTRACT

This disclosure is directed to techniques for identifying relevant objects within an environment. For instance, a vehicle may use sensor data to determine a candidate trajectory associated with the vehicle and a predicted trajectory associated with an object. The vehicle may then use the candidate trajectory and the predicted trajectory to determine an interaction between the vehicle and the object. Based on the interaction, the vehicle may determine a time difference between when the vehicle is predicted to arrive at (Continued)

a location and when the object is predicted to arrive at the location. The vehicle may then determine a relevance score associated with the object using the time difference. Additionally, the vehicle may determine whether to input object data associated with the object into a planner component based on the relevance score. The planner component determines one or more actions for the vehicle to perform.

20 Claims, 9 Drawing Sheets

IDENTIFYING RELEVANT OBJECTS WITHIN AN ENVIRONMENT

BACKGROUND

Perception systems and prediction systems utilize sensor data from sensors of a vehicle in order to determine information about objects within an environment, such as the locations, predicted trajectories, and predicted velocities of the objects. This information is then used by planning systems to determine actions for the vehicle to perform while operating in the environment. For instance, the planning systems may determine the actions in order to avoid the objects, such as by yielding to the objects, changing lanes to avoid the objects, and/or the like. However, based on the number of objects within the environment, the planning systems may require a large amount of computing resources (e.g., memory, processing power, etc.) and/or an increased processing time to determine the actions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
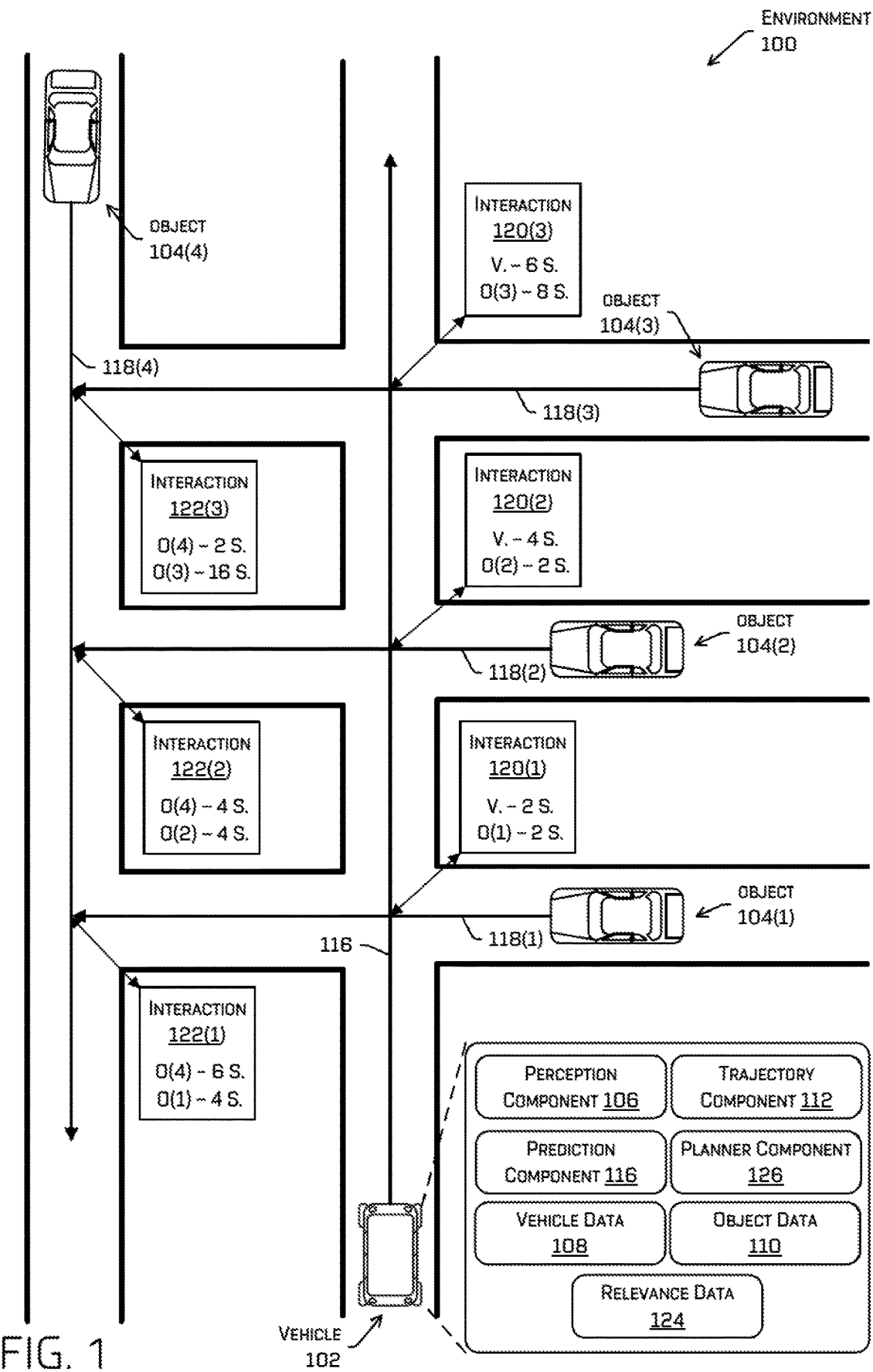
FIG. 1 is an illustration of an example environment that includes a vehicle determining relevance score(s) for object (s) and then using the relevance scores to determine relevant object(s) within the environment.

As discussed herein, perception and/or prediction systems utilize sensor data from sensors of a vehicle in order to determine information about objects within an environment. The information may include, but is not limited to, the locations, predicted trajectories, and predicted velocities of the objects. This information is then used by planning systems to determine actions for the vehicle to perform while operating in the environment. For instance, the planning systems may determine the actions in order to avoid the objects, such as by yielding to the objects, changing lanes to avoid the objects, and/or the like. However, based on the number of objects within the environment, the planning systems may require a large amount of computing resources (e.g., memory, processing power, etc.) and/or an increased processing time to determine the actions.

As such, techniques for identifying relevant objects within an environment are discussed herein. For instance, a vehicle may receive sensor data from one or more sensors. The vehicle may then analyze the sensor data, such as by using a perception component and/or a prediction component, to identify potential interactions between the vehicle and object(s) and/or potential interactions between two objects. Based on identifying the potential interactions, the vehicle may determine a respective relevance score for each (e.g., some or all) object for which the vehicle identifies a potential interaction and use the relevance scores to identify the relevant object(s) within the environment. For example, the vehicle may identify the relevant object(s) as object(s) that include relevance score(s) that satisfy (e.g., are equal to or greater than) a threshold score and/or include relevance score(s) that are within a threshold number of the highest relevance scores. The vehicle may then input data associated with these relevant object(s) into a planner component so that the planner component is able to determine actions for the vehicle to perform.

For more detail, the vehicle may analyze the sensor data using a perception component in order to determine object data associated with objects and/or vehicle data associated with the vehicle. The object data for an object may include, but is not limited to, position data, orientation data, heading data, velocity data, speed data, acceleration data, yaw rate data, turning rate data, and/or the like associated with the object. Additionally, the vehicle data may include, but is not limited to, position data, orientation data, heading data, velocity data, speed data, acceleration data, yaw rate data, turning rate data, lane data, and/or the like associated with the vehicle. The vehicle may then analyze the object data, the vehicle data, and/or map data to determine at least one candidate trajectory associated with the vehicle and predicted trajectories associated with the objects.

In some examples, the prediction component and/or a trajectory components samples a candidate trajectory and/or a predicted trajectory using a given time step. The time step may include, but is not limited to, 0.1 seconds, 0.3 seconds, 0.5 seconds, 1 second, and/or any other time step. In some examples, the vehicle may determine the time step for the sampling using one or more factors. The one or more factors may include, but are not limited to, a velocity of the vehicle, a velocity of the object, a distance between the vehicle and the object, a classification associated with the object, a desired resolution, and/or the like.

Additionally, in some examples, the trajectory component determines a respective candidate trajectory for each (e.g., some or all) surface (e.g., lane) that a vehicle is able to navigate. For example, if the vehicle is traveling along a three-lane highway, the trajectory component may determine three candidate trajectories for the vehicle, where each candidate trajectory is associated with a respective lane. Furthermore, in some examples, the trajectory component uses one or more longitudinal controllers when determining the candidate trajectory. For example, the trajectory component may determine that the vehicle travels at the velocity of another vehicle if the vehicle is currently following the other vehicle or the vehicle travels at the speed limit if the vehicle is not currently following another vehicle.

The vehicle may then use the one or more candidate trajectories associated with the vehicle and/or the predicted trajectories associated with the objects to identify potential interactions between the vehicle and object(s). As described herein, a potential interaction between the vehicle and an object may include a direct interaction with the vehicle. In some examples, to determine a potential interaction with an object, the vehicle may analyze a candidate trajectory associated with the vehicle and a predicted trajectory associated with the object in order to determine a closest distance between the vehicle and the object at a future time. The vehicle may then determine that there is the potential interaction when the distance satisfies (e.g., is less than or equal to) a threshold distance or determine that there is no potential interaction when the distance does not satisfy (e.g., is greater than) the threshold distance. As described herein, the threshold distance may include, but is not limited to, 0.5 meters, 1 meter, 2 meters, and/or any other distance. Additionally, in some examples, the vehicle may determine the threshold distance using one or more factors, such as, but not limited to, the velocity of the vehicle, the velocity of the object, the classification of the object, map and/or environmental information including policy information (e.g., rules of the road, stop lights, etc.) and/or the like.

In addition to determining the direct interactions, the vehicle may use predicted trajectories associated with two different objects in order to identify potential interactions between the objects. As described herein, a potential interaction between two objects may include an indirect interaction. In some examples, the vehicle may determine that there is an indirect interaction between two objects using similar processes that the vehicle uses to determine the direct interactions. For example, to determine a potential interaction between two objects, the vehicle may analyze a first predicted trajectory associated with a first object and a second predicted trajectory associated with a second object in order to determine a closest distance between the objects at a future time. The vehicle may then determine that there is the potential interaction when the distance satisfies (e.g., is less than or equal to) a threshold distance or determine that there is no potential interaction when the distance does not satisfy (e.g., is greater than) the threshold distance. In some examples, the vehicle may determine the threshold distance using one or more factors, such as, but not limited to, the velocity of the first object, the velocity of the second object, the classification of the first object, the classification of the second object, and/or the like.

The vehicle may then determine relevance scores for objects that include potential interactions. In some examples, and for a direct interaction, the vehicle may determine the relevance score based at least on a time difference between a first time that the vehicle is predicted to arrive at a location associated with the interaction and a second time that the object is predicted to arrive at the location. For example, the relevance score may be within a given range, such as 0 to 1, where the relevance score is determined using an inverse of the time difference. For instance, the lower the time difference, the greater the relevance score, and the higher the time difference, the lower the relevance score. Such a function used to determine the score may be linear, non-linear, etc. Additionally, in some examples, the vehicle may determine a higher relevance score when the time difference is negative (e.g., the object arrives at the location before the vehicle) and a lower relevance score when the time difference is positive (e.g., the vehicle arrives at the location before the object). This is because the object may stop within the location, which increases the relevance for the object.

In some examples, the vehicle may use one or more additional techniques when determining the relevance score associated with the object. For example, the vehicle may use a threshold time difference that the vehicle uses to determine a minimum relevance score. For instance, when the time difference is greater than the threshold time difference, the vehicle may determine that the relevance score includes a minimum relevance score (e.g., a relevance score of 0). The threshold time difference may include, but is not limited to, 5 seconds, 7 seconds, 10 second, and/or any other time. In some examples, the vehicle determines the threshold time difference based on one or more factors, such as, but not limited to, the velocity of the vehicle, the velocity of the object, the classification of the object, and/or the like.

Additionally, or alternatively, in some examples, such as where the vehicle determines more than one candidate trajectory for more than one driving surface, the vehicle may determine a respective relevance score for objects associated with each candidate trajectory. The vehicle may then determine the final relevance score for the object as the highest relevance score among the relevance scores. For example, if the vehicle determines a first relevance score of 0.9 that is associated with a first candidate trajectory for a first lane and a second relevance score of 0.5 that is associated with a second candidate trajectory for a second lane, then the vehicle may determine that the final relevance score for the object is 0.9. This is because the first relevance score is greater than the second relevance score. By taking the highest relevance score between multiple proposed trajectories, the vehicle is ensuring safe operation by conservatively deciding to include the object in relevancy determinations.

The vehicle may also determine relevance scores for indirect interactions between two other objects. In some examples, the vehicle may determine such relevance scores since the interactions between the two other objects may also impact how the vehicle traverses through the environment. For example, and as illustrated at least in FIG. 1, if a first object that includes both (1) a potential interaction with the vehicle and (2) an indirect interaction with a second object, then the indirect interaction may change the driving behavior of the first object. By changing the driving behavior, the likelihood of the potential interaction between the first object and the vehicle may increase.

In some examples, and for an indirect interaction, the vehicle may determine the relevance score based at least on a time difference between a first time that a first object is predicted to arrive at a location associated with the interaction and a second time that a second object is predicted to arrive at the location. Again, the relevance score may be within a given range, such as 0 to 1, where the relevance score is determined using an inverse of the time difference. For instance, the lower the time difference, the greater the relevance score, and the higher the time difference, the lower the relevance score. Additionally, the vehicle may use the threshold time difference when determining the relevance score for the potential interaction. Furthermore, for an indirect interaction, the vehicle may determine that the relevance score cannot be higher than the relevance score for a direct interaction that is associated with one of the two objects.

For example, the vehicle may determine that a first relevance score associated with a first direct interaction with a first object is 0.8, a second relevance score associated with a second direct interaction with a second object is 0.5, a third relevance score associated with a first indirect interaction between the first object and a third object is 0.9, and a fourth relevance score associated with a second indirect interaction between the second object and the third object is 0.4. In such an example, the vehicle may determine that a final relevance score for the third object is the fourth relevance score of 0.4 even though the third relevance score is 0.9. This is because the third relevance score of 0.9 is greater than the first relevance score of 0.8.

The vehicle may then determine which object(s) are relevant for the planner component using the relevance scores. In some examples, the vehicle may determine that object(s) are relevant based on the relevant score(s) for the object(s) satisfying a threshold score. The threshold score may include, but is not limited to, 0.1, 0.3, 0.4, 0.5, and/or any other score. In some examples, the vehicle may determine that object(s) are relevant based on the relevant score(s) for the object(s) being within a threshold number of the highest relevance scores from among the relevance scores. The threshold number may include, but is not limited to, 10 scores, 20 scores, 50 scores, 100 scores, and/or any other number of scores. For example, if the vehicle determines that there are 100 relevance scores for 100 objects that satisfy the threshold score, the vehicle may then select the top 50 relevance score from among the 100 relevance scores.

The vehicle may then input object data associated with the relevant objects(s) into the planner component. The object data for a relevant object may include, but is not limited to, position data, orientation data, heading data, velocity data, speed data, acceleration data, yaw rate data, turning rate data, trajectory data, and/or the like associated with the relevant object. The planner component may then analyze the object data associated with the relevant object(s) in order to determine one or more actions for the vehicle to perform. Additionally, based on the output from the planner component, the vehicle may be configured to perform the one or more actions.

In some examples, by performing the processes described herein, the vehicle may reduce the number of objects that the planner component analyzes when determining actions for the vehicle to perform. For instance, the planner component may analyze the objects that are relevant to the vehicle, such as the objects that include potential interactions with the vehicle or other objects that interact with the vehicle, but not analyze objects that are irrelevant to the vehicle, such as objects that do not include potential interactions with the vehicle or other objects that interact with the vehicle. This may reduce the amount of computing resources required by the planner component to determine the actions for the vehicle. Additionally, this may reduce the time it takes for the planner component to determine the actions. Reducing the time it takes for the planner component to determine the actions may increase the overall safety of the vehicle when navigating around the environment. Alternatively, compute resources that may otherwise have been dedicated to irrelevant objects may be dedicated to relevant objects to provide for increased precision in predictions, etc.

The techniques described herein may be implemented in a number of ways. Example implementations are provided below with reference to the following figures. Although discussed in the context of an autonomous vehicle, the methods, apparatuses, and systems described herein may be applied to a variety of systems and is not limited to autonomous vehicles. In another example, the techniques may be utilized in an aviation or nautical context, or in any system using sensor data. Additionally, the techniques described herein may be used with real data (e.g., captured using sensor(s)), simulated data (e.g., generated by a simulator), or any combination of the two.

FIG. 1 is an illustration of an example environment 100 that includes a vehicle 102 determining relevance scores for objects 104(1)-(4) (also referred to as "objects 104") and then using the relevance scores to determine relevant object(s) 104 within the environment 100. As shown, the environment 100 includes at least the vehicle 102 and the objects 104 navigating along roads of the environment 100. In the example of FIG. 1, the vehicle 102 may analyze sensor data and/or map data using a perception component 106 in order to determine vehicle data 108 associated with the vehicle 102 and object data 110 associated with each of the objects 104. As described herein, the object data 110 for an object 104 may include, but is not limited to, position data, orientation data, heading data, velocity data, speed data, acceleration data, yaw rate data, turning rate data, and/or the like associated with the object 104. Additionally, the vehicle data 108 may include, but is not limited to, position data, orientation data, heading data, velocity data, speed data, acceleration data, yaw data, turning rate data, lane data, and/or the like associated with the vehicle 102.

The vehicle 102 may then use a trajectory component 112 in order to analyze the vehicle data and/or map data to determine at least one candidate trajectory associated with the vehicle 102. The vehicle 102 may also use a prediction component 114 in order to analyze the object data 110 and/or the map data to determine predicted trajectories associated with the objects 104. For example, and as shown, the trajectory component 112 may analyze the vehicle data 108 and the map data in order to determine a candidate trajectory 116 associated with the vehicle 102. Additionally, the prediction component 114 may analyze the object data 110 and/or the map data in order to determine a first predicted trajectory 118(1) associated with the first object 104(1), a second predicted trajectory 118(2) associated with the second object 104(2), a third predicted trajectory 118(3) associated with the third object 104(3), and a fourth predicted trajectory 118(4) associated with the fourth object 104(4). While the example of FIG. 1 illustrates the candidate trajectory 116 and the predicted trajectories 118(1)-(4) (also referred to as "predicted trajectories 118") as including straight paths, in other examples, the candidate trajectory 116 and/or the predicted trajectories 118 may not include straight paths. Additionally, while the example of FIG. 1 illustrates determining a single candidate trajectory 116 and a single predicted trajectory 118 for each object 104, in other examples, the prediction component 114 may determine more than one candidate trajectory 116 and/or more than one predicted trajectory 118 for each object 104.

The vehicle 102 may then use the candidate trajectory 116 associated with the vehicle 102 and the predicted trajectories 118 associated with the objects 104 to identify potential interactions 120(1)-(3) (also referred to as "potential interactions 120" or "direct interactions 120") between the vehicle 102 and the objects 104. For example, and for the first object 104(1), the vehicle 102 may analyze the candidate trajectory 116 and the first predicted trajectory 118(1) associated with the first object 104(1) in order to determine a closest distance between the vehicle 102 and the first object 104(1) at a future time, which is described in more detail with regard to FIG. 4. The vehicle 102 may then determine that there is the potential interaction 120(1) when the distance satisfies (e.g., is less than or equal to) a threshold distance or determine that there is no potential interaction when the distance does not satisfy (e.g., is greater than) the threshold distance. As described herein, the threshold distance may include, but is not limited to, 0.5 meters, 1 meter, 2 meters, and/or any other distance. Additionally, in some examples, the vehicle 102 may determine the threshold distance using one or more factors, such as, but not limited to, the velocity of the vehicle 102, the velocity of the first object 104(1), the classification of the first object 104(1), and/or the like.

In addition to determining the direct interactions 120, the vehicle 102 may use the predicted trajectories 118 associated with two different objects 104 in order to identify potential interactions 122(1)-(3) (also referred to as "potential interactions 122" or "indirect interactions 122") between the objects 104. For instance, the vehicle 102 may determine that there is the potential interaction 122 between two objects 104 using similar processes that the vehicle 102 uses to determine the potential interactions 120. For example, to determine the potential interaction 122(1) between the first object 104(1) and the fourth object 104(4), the vehicle 102 may analyze the first predicted trajectory 118(1) associated with the first object 104(1) and the fourth predicted trajectory 118(4) associated with the fourth object 104(4) in order to determine a closest distance between the first object 104(1) and the fourth object 104(4) at a future time. The vehicle 102 may then determine that there is the potential interaction 122(1) when the distance satisfies (e.g., is less than or equal to) a threshold distance or determine that there is no potential interaction when the distance does not satisfy (e.g., is greater than) the threshold distance. In some examples, the vehicle 102 may determine the threshold distance using one or more factors, such as, but not limited to, the velocity of the first object 104(1), the velocity of the fourth object 104(4), the classification of the first object 104(1), the classification of the fourth object 104(4), and/or the like.

In some examples, the vehicle 102 determines the indirect interactions 122 since one or more of the indirect interactions 122 may be relevant to the vehicle 102. For example, even though the vehicle 102 determines that there is not a direct interaction between the vehicle 102 and the object 104(4), the object 104(4) may still change the driving behavior(s) of one or more of the object 104(1)-(3) based on the indirect interaction(s) 122. By changing the driving behavior(s) of one or more of the objects 140(1)-(3), the object 104(4) may further effect one or more of the direct interactions 120 between the vehicle 102 and one or more of the object(s) 140(1)-(3).

The vehicle 102 may then determine relevance scores for the objects 104 that include potential interactions 120, 122, where the relevance scores are represented by relevance data 124. In some examples, and for the direct interaction 120(1), the vehicle 102 may determine a first time that the vehicle 102 is predicted to arrive at the location associated with the direct interaction 120(1) (e.g., the crossing of the candidate trajectory 116 and the first predicted trajectory 118(1)) and a second time that the first object 104(1) is predicted to arrive at the location. The vehicle 102 may then determine a time difference between the first time and the second time. In the example of FIG. 1, the first time may include 2 seconds and the second time may include 2 seconds. As such, the time difference may include 0 seconds. The vehicle 102 may then determine the relevance score associated with the first object 104(1) based on the time difference.

For example, and as described herein, the relevance score may be within a given range, such as 0 to 1, where the relevance score is determined using an inverse of the time difference. For instance, the lower the time difference, the greater the relevance score, and the higher the time difference, the lower the relevance score. Additionally, in some examples, the vehicle 102 may determine a higher relevance score when the time difference is negative (e.g., the object 104 arrives at the location before the vehicle 102) and a lower relevance score when the time difference is positive (e.g., the vehicle 102 arrives at the location before the object 104). This is because the object 104 may stop while within the location, which increases the relevance for the object 104. The vehicle 102 may then perform similar processes for each of the other objects 104(2)-(3) in order to determine the relevance scores associated with the objects 104(2)-(3). Examples of determining the relevance scores are illustrated and described more with respect to FIG. 5.

In the example of FIG. 1, the vehicle 102 may determine that the first object 104(1) includes a highest relevance score among the objects 104(1)-(3). This is because the time difference associated with the first object 104(1) is the lowest among the objects 104(1)-(3). Additionally, the vehicle 102 may determine that the second object 104(2) includes a higher relevance score than the third object 104(3) even though the time difference for the objects 104(2)-(3) is the same (e.g., 2 seconds). This is because the time difference for the second object 104(2) is negative, since the second object 104(2) arrives at the location associated with the potential interaction 120(2) before the vehicle 102, while the time difference for the third object 104(3) is positive, since the vehicle 102 arrives at the location associated with the potential interaction 120(3) before the third object 104(3). As such, there is a potential for the second object 104(2) to stop within the location, which increases the chances for the potential interaction 120(2) as compared to the potential interaction 120(3).

The vehicle 102 may then perform similar processes for the potential interactions 122. For example, and for the indirect interaction 122(1), the vehicle 102 may determine a first time that the first object 104(1) is predicted to arrive at the location associated with the indirect interaction 122(1) (e.g., the crossing of the first predicted trajectory 118(1))) and the fourth predicted trajectory 118(4))) and a second time that the fourth object 104(4) is predicted to arrive at the location. The vehicle 102 may then determine a time difference between the first time and the second time. In the example of FIG. 1, the first time may include 4 seconds and the second time may include 6 seconds. As such, the time difference may include 2 seconds. The vehicle 102 may then determine a first relevance score associated with the fourth object 104(4) based on the time difference.

For example, and as described herein, the relevance score may again be within a given range, such as 0 to 1, where the relevance score is determined using an inverse of the time difference. For instance, the lower the time difference, the greater the relevance score, and the higher the time difference, the lower the relevance score. The vehicle 102 may then perform similar processes in order to determine a second relevance score associated with the second potential interaction 122(2) and a third relevance score associated with the third potential interaction 122(3). Examples of determining the relevance scores are again illustrated and described more with respect to FIG. 5.

In the example of FIG. 1, the vehicle 102 may determine that the first relevance score associated with the first potential interaction 122(1) includes the highest relevance score since the first relevance score is associated with the lowest time difference. The vehicle 102 may then determine that the second relevance score associated with the second potential interaction 122(2) includes the second highest relevance score since the second relevance score is associated with the second lowest time difference. Finally, the vehicle 102 may determine that the third relevance score associated with the third potential interaction 122(3) includes the lowest relevance score since the third relevance score is associated with the greatest time difference. However, in some examples, the vehicle 102 may also determine that the third relevance score is the minimum relevance score (e.g., 0) since the time difference associated with the third relevance score is greater than a time difference threshold.

The vehicle 102 may then determine which relevant score to associated with the fourth object 104(4). For example, the vehicle 102 may determine to associate the first relevance score with the fourth object 104(4) when the first relevance score is less than or equal to the relevance score associated with the potential interaction 120(1). However, if the first relevance score is greater than the relevance score associated with the potential interaction 120(1), then the vehicle 102 may determine to associate the second relevance score with the fourth object 104(4) when the second relevance score is less than or equal to the relevance score associated with the potential interaction 120(2). However, if the second relevance score is greater than the relevance score associated with the potential interaction 120(2), then the vehicle 102 may determine to associate the third relevance score with the fourth object 104(4) when the third relevance score is less than or equal to the relevance score associated with the potential interaction 120(3).

The vehicle 102 may then determine which object(s) 104 are relevant for a planner component 126 using the relevance scores. In some examples, the vehicle 102 may determine that object(s) 104 are relevant based on the relevant score(s) for the object(s) 104 satisfying a threshold score. The threshold score may include, but is not limited to, 0.1, 0.3, 0.4, 0.5, and/or any other score. Additionally, or alternatively, in some examples, the vehicle 102 may determine that object(s) 104 are relevant based on the relevant score(s) for the object(s) 104 being within a threshold number of the highest relevance scores from among the relevance scores. The threshold number may include, but is not limited to, 10 scores, 20 scores, 50 scores, 100 scores, and/or any other number of scores. For example, the vehicle 102 may determine that the relevance score associated with the first object 104(1) is 1, the relevance score associated with the second object 104(2) is 0.7, the relevance score associated with the third object is 0.6, and the relevance score associated with the fourth object 104(4) is 0.7. If the vehicle 102 only selects the top three relevance scores, then the vehicle 102 may determine that the first object 104(1), the second object 104(2), and the fourth object 104(4) are relevant.

The vehicle 102 may then input object data 110 associated with the relevant objects(s) 104 into the planner component 126. The object data 110 for a relevant object may include, but is not limited to, position data, orientation data, heading data, velocity data, speed data, acceleration data, yaw rate data, turning rate data, trajectory data, and/or the like associated with the relevant object. The planner component 126 may then analyze the object data 110 associated with the relevant object(s) 104 in order to determine one or more actions for the vehicle 102 to perform. For example, the planner component 126 may determine a final trajectory that the vehicle 102 uses to traverse through the environment 100.

In some examples, the trajectory component 112 uses less data and/or computational resources when determining the one or more candidate trajectories than the planner component 126 uses when determining the final trajectory. For a first example, the trajectory component 112 may use the location of the vehicle 102, the potential path(s) (e.g., lane(s)) that the vehicle 102 is able to travel, and either an object velocity or speed limit to determine the one or more candidate trajectories. In contrast, the planner component 126 may use the vehicle data 108, the object data 110, the map data, the sensor data, and/or additional data to determine the final trajectory. For a second example, the trajectory component 112 may use first algorithm(s) to determine the one or more candidate trajectories and the planner component 126 may use second algorithm(s) to determine the final trajectory, where the first algorithm(s) use more computing resources than the second algorithm(s). As such, by only inputting so the object data 110 for the relevant object(s) into the planner component 126, the vehicle 102 saves computation resources.

As described above, the vehicle 102 may determine different relevance scores for a single object based on different candidate trajectories associated with the vehicle 102. As such, FIG. 2 is an illustration of an example environment 200 that includes the vehicle 102 determining multiple relevant scores for an object 202 based on different candidate trajectories 204(1)-(3) (also referred to as "candidate trajectories 204") for the vehicle 102.

Figure 2:
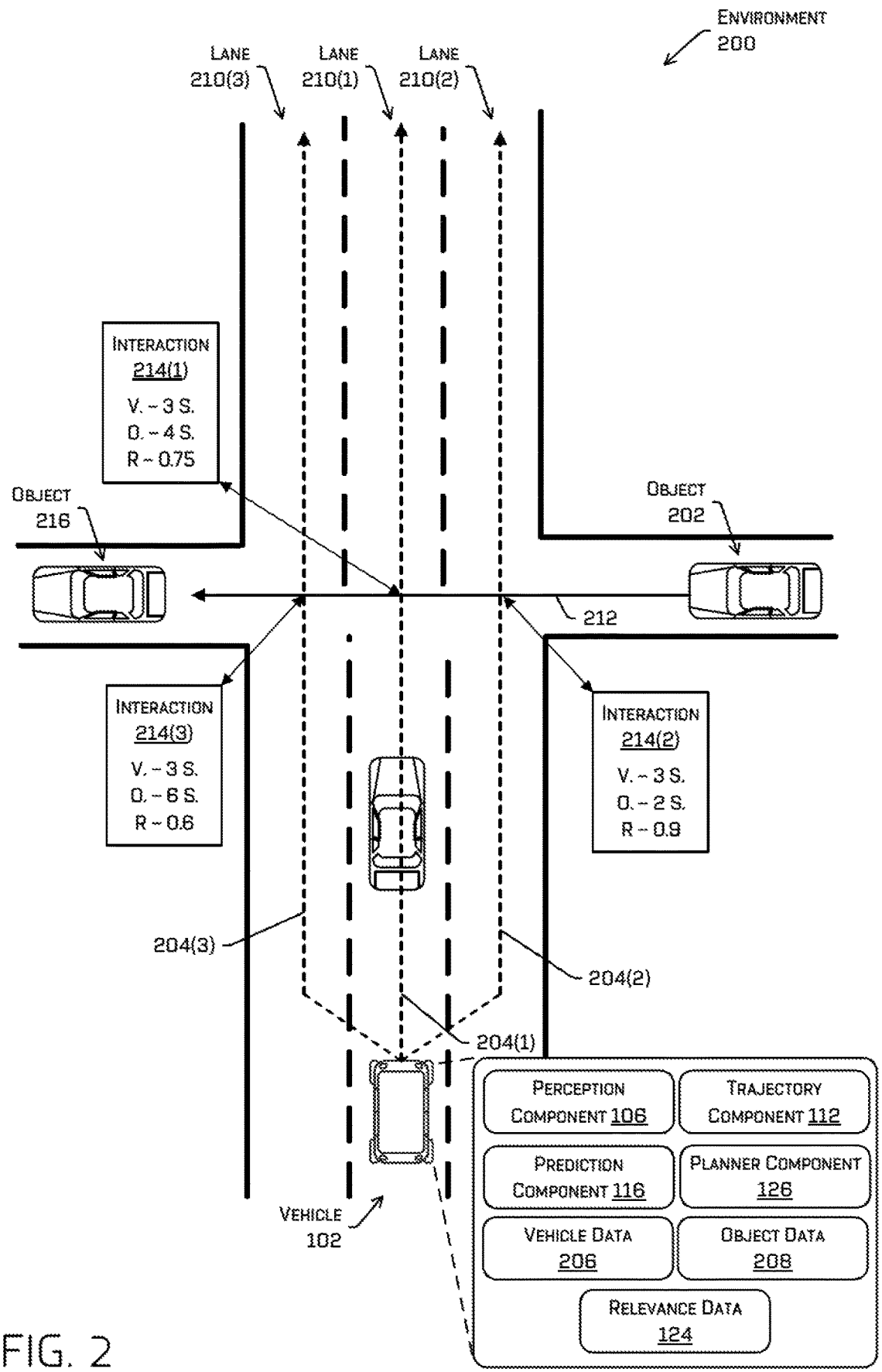
FIG. 2 is an illustration of an example environment that includes a vehicle determining multiple relevant scores for an object based on different candidate trajectories for the vehicle.

For instance, and in the example of FIG. 2, the vehicle 102 may again receive the sensor data from the one or more sensors. The vehicle 102 may then use the perception component 106 in order to analyze the sensor data and determine the vehicle data 206 associated with the vehicle 102. As described herein, the vehicle data 206 may include, but is not limited, position data, orientation data, heading data, velocity data, speed data, acceleration data, yaw data, turning rate data, lane data, and/or the like associated with the vehicle 102. The vehicle 102 may also use the perception component 106 in order to analyze the sensor data and determine object data 208 associated with the object (not labeled for clarity reasons) that is along the path of the vehicle 102. As described herein, the object data 208 may include, but is not limited to, position data, orientation data, heading data, velocity data, speed data, acceleration data, yaw data, turning rate data, lane data, and/or the like associated with the object. The vehicle 102 may then use the trajectory component 112 to analyze the vehicle data 206 and/or map data in order to determine the candidate trajectories 204 associated with the vehicle 102.

For example, the trajectory component 112 may determine the first candidate trajectory 204(1) associated with the vehicle 102 remaining in a first lane 210(1) and following the object. The trajectory component 112 may then determine a first candidate velocity associated with the first candidate trajectory 204(1). Since the vehicle 102 is following the object, the trajectory component 112 may determine that the first candidate velocity includes the velocity of the object, as represented by the object data 208. However, in some examples, the trajectory component 112 may set a maximum velocity, such as the speed limit associated with the roadway.

For a second example, the trajectory component 112 may determine that the vehicle 102 is able to switch to a second lane 210(2) of the roadway. As such, the trajectory component 112 may determine the second candidate trajectory 204(2) associated with the vehicle 102 switching to the second lane 210(2). The trajectory component 112 may further determine a second candidate velocity associated with the second candidate trajectory 204(2). Since there are no other objects located in the second lane 210(2), the trajectory component 112 may determine that the second candidate velocity includes the speed limit of the roadway. In the example of FIG. 2, the speed limit associated with the roadway may be greater than the velocity of the object that is located in front of the vehicle 102.

For a third example, the trajectory component 112 may determine that the vehicle 102 is able to switch to a third lane 210(3) of the roadway. As such, the trajectory component 112 may determine the third candidate trajectory 204(3) associated with the vehicle 102 switching to the third lane 210(3). The trajectory component 112 may further determine a third candidate velocity associated with the third candidate trajectory 204(3). Again, since there are no other objects located in the third lane 210(3), the trajectory component 112 may determine that the third candidate velocity includes the speed limit of the roadway. Also, in the example of FIG. 2, the speed limit associated with the roadway may again be greater than the velocity of the object that is located in front of the vehicle 102.

The vehicle 102 may also perform the processes described herein in order to determine a predicted trajectory 212 associated with the object 202. As shown, the predicted trajectory 212 associated with the object 202 crosses all three lanes 210 of the roadway. As such, the vehicle 102 may perform the processes described herein in order to determine that the is a first potential interaction 214(1) with the object 202 along the first candidate trajectory 204(1), a second potential interaction 214(2) with the object 202 along the second candidate trajectory 204(2), and a third potential interaction 214(3) with the object 202 along the third candidate trajectory 204(3).

The vehicle 102 may then determine the relevance scores associated with the potential interactions 214(1)-(3) (also referred to as "potential interactions 214"). For a first example, the vehicle 102 may determine a first time that the vehicle 102 is predicted to arrive at a first location associated with the first potential interaction 214(1) (e.g., the crossing of the first candidate trajectory 204(1) and the predicted trajectory 212) and a second time that the object 202 is predicted to arrive at the first location. The vehicle 102 may then determine a first time difference between the first time and the second time. In the example of FIG. 2, the first time may include 6 seconds and the second time may include 4 seconds. As such, the first time difference may include 2 seconds. The vehicle 102 may then determine a first relevance score associated with the first candidate trajectory 204(1) based on the first time difference.

For a second example, the vehicle 102 may determine a third time that the vehicle 102 is predicted to arrive at a second location associated with the second potential interaction 214(2) (e.g., the crossing of the second candidate trajectory 204(2) and the predicted trajectory 212) and a fourth time that the object 202 is predicted to arrive at the second location. The vehicle 102 may then determine a second time difference between the third time and the fourth time. In the example of FIG. 2, the third time may include 3 seconds and the fourth time may include 2 seconds. As such, the second time difference may include 1 second. The vehicle 102 may then determine a second relevance score associated with the second candidate trajectory 204(2) based on the second time difference.

For a third example, the vehicle 102 may determine a fifth time that the vehicle 102 is predicted to arrive at a third location associated with the third potential interaction 214(3) (e.g., the crossing of the third candidate trajectory 204(3) and the predicted trajectory 212) and a sixth time that the object 202 is predicted to arrive at the location. The vehicle 102 may then determine a third time difference between the fifth time and the sixth time. In the example of FIG. 2, the fifth time may include 3 seconds and the sixth time may include 6 seconds. As such, the third time difference may include 3 seconds. The vehicle 102 may then determine a third relevance score associated with the third candidate trajectory 204(3) based on the third time difference.

In the example of FIG. 2, the vehicle 102 may determine that the second relevance score includes a highest relevance score since the second time difference is the lowest time difference. Additionally, the vehicle 102 may determine that the first relevance score includes a second highest relevance score since the second time difference is the second lowest time difference. Furthermore, the vehicle 102 may determine that the third relevance score includes a lowest relevance score since the third time difference is the greatest time difference. For instance, and in the example of FIG. 2, the second relevance score is 09, the first relevance score is 0.75, and the third relevance score is 0.6. As such, in some examples, the vehicle 102 may determine that the final relevance score associated with the object 202 includes the highest relevance score of 0.9. However, in other examples, the vehicle 102 may determine that the final relevance score associated with the object 202 includes the relevance score associated with trajectory for which the vehicle 102 is going to navigate.

As further illustrated in the example of FIG. 2, the vehicle 102 may determine that there is a potential interaction between the vehicle 102 and the object that the vehicle 102 is following using the first candidate trajectory 204(1) and a predicted trajectory associated with the object (e.g., the object continues along the lane 210(1)). The vehicle 102 may then determine a time difference between when the object is going to be at a location (e.g., the current location of the object) and when the vehicle 102 is going to be at the location. Additionally, the vehicle 102 may use the time difference to determine a relevance score associated with the object, using one or more of the processes described herein. In other words, the vehicle 102 may determine relevance scores for objects that the vehicle 102 is following and/or potential following, such as another object is in one of the lanes 210(2)-(3).

Furthermore, the vehicle 102 may determine that there is a potential interaction between the object 202 and another object 216 that the object 202 is following using the predicted trajectory 212 and a predicted trajectory associated with the object 216. The vehicle 102 may then determine a time difference between when the object 216 is going to be at a location (e.g., the current location of the object 216) and when the object 202 is going to be at the location. Additionally, the vehicle 102 may use the time difference to determine a relevance score associated with the object 216, using one or more of the processes described herein. In other words, the vehicle 102 may determine relevance scores for objects that other objects are following, where the other objects include interactions with the vehicle 102.

Figure 3:
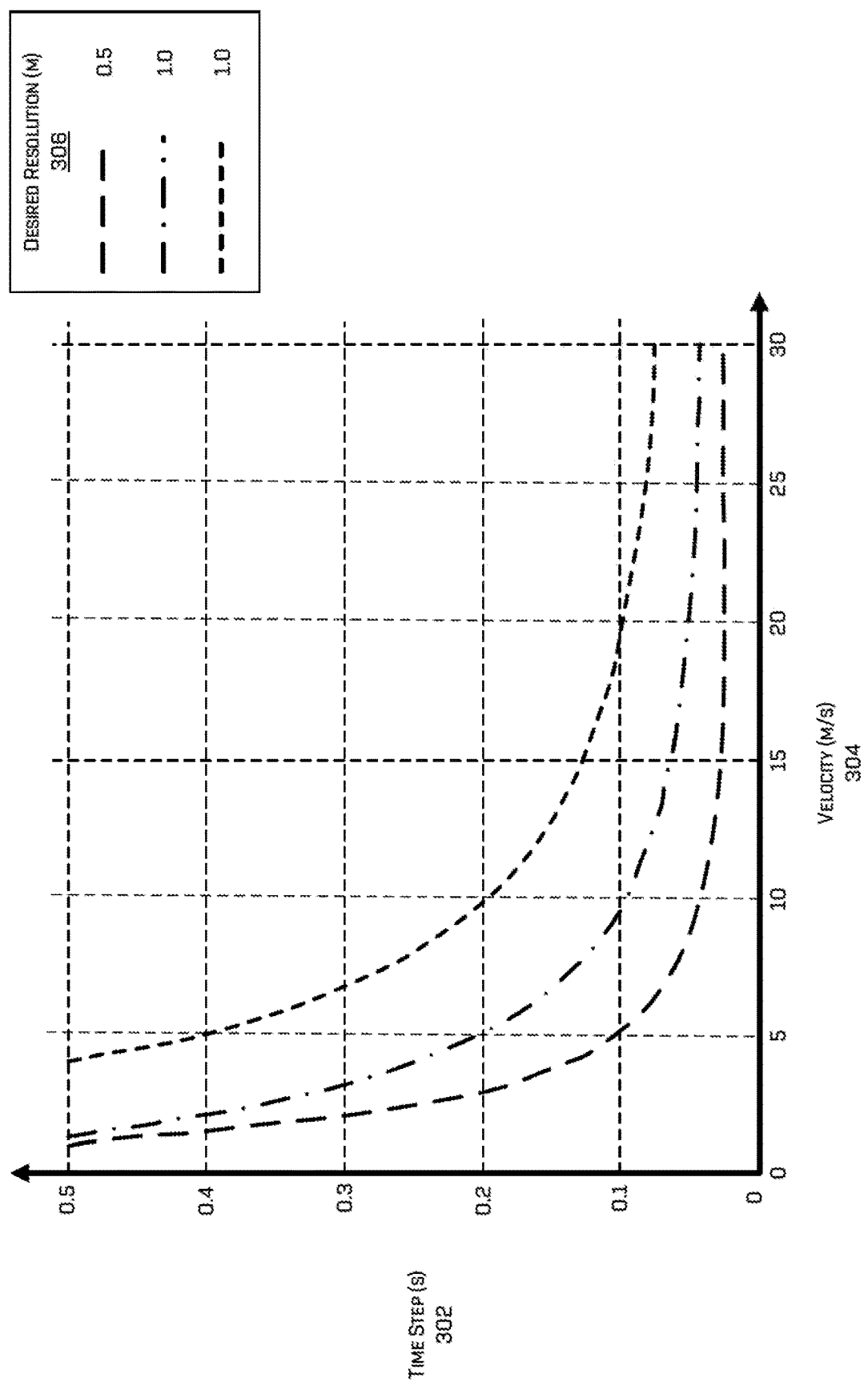
FIG. 3 illustrates an example of determining a sampling to use when determining trajectories of a vehicle and/or an object.

In the examples above, the vehicle 102 may determine the trajectories associated with the vehicle 102 and/or the objects by sampling the possible trajectories. As such, FIG. 3 illustrates an example of determining a sampling to use when determining trajectories of the vehicle 102 and/or an object. As shown, the example illustrates time steps 302 to velocities 304 for different desired resolutions 306 in space. As shown, the greater the velocity 304 associated with the object, the smaller the time step 302 that is required in order to maintain the desired resolution 306. In some examples, in order to obtain an approximately uniform spatial-sampling trajectory, the vehicle 102 may employ an adaptive time sampling strategy such that a time step $\Delta t$ is given by the example equation:

$$\Delta t = \begin{cases} \frac{\Delta s_d}{v}, & \text{if } \Delta s_d \le v \times \Delta t_{max} \\ \Delta t_{max}, & \text{otherwise} \end{cases} \quad (1)$$

In equation (1), $\Delta s_d$ is the desired arc length between two consecutive poses along the trajectory, $\Delta t_{max}$ is the maximum time step, and v is the velocity of the object.

Figure 4:
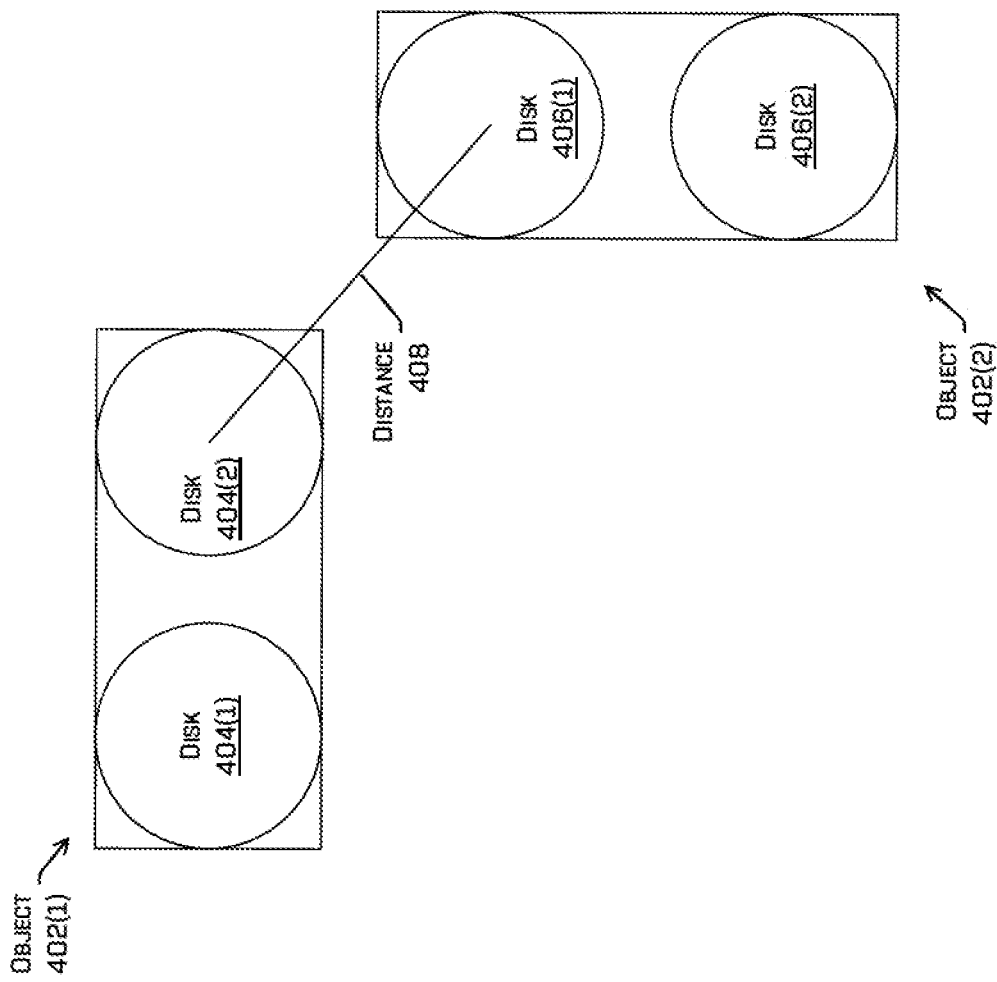
FIG. 4 illustrates an example of determining when a vehicle is interacting with an object.

As described above, the vehicle 102 may use the candidate trajectory associated with the vehicle 102 and a predicted trajectory associated with an object to determine when there is a potential interaction between the vehicle 102 and the object. As such, FIG. 4 illustrates an example of determining when a first object 402(1), such as the vehicle 102, is interacting with a second object 402(2).

As shown, the first object 402(1) may be represented by two disks 404(1)-(2) (also referred to as "disks 404"). The first disk 404(1) may represent a back of the first object 402(1) while the second disk 404(2) represents a front of the first object 402(1). Additionally, the second object 402(2) may be represented by two disks 406(1)-(2) (also referred to as "disks 406"). The first disk 406(1) may represent a back of the second object 402(2) while the second disk 406(2) represents a front of the second object 402(2). The vehicle 102 may then determine a distance 408 between the first object 402(1) and the second object 402(2). Additionally, the vehicle 102 may determine that there is an interaction between the first object 402(1) and the second object 402(2) when the distance 408 satisfies (e.g., is less than or equal to) a threshold distance, and determine that there is no interaction between the first object 402(1) and the second object 402(2) when the distance 408 does not satisfy (e.g., is greater than) the threshold distance.

The vehicle 102 may perform one or more processes in order to determine whether the first object 402(1) interacts with the second object 402(2). An example equation may include:

$$d_{i,j} \le r_i + r_j + \bar{r} \quad (2)$$

In equation (2), $d_{i,j}$ includes the distance between the center of the disk 404(2) of the first object 402(1) and the center of the disk 406(1) of the second object 402(2), $r_i$ includes the radius of the second disk 404(2), $r_j$ includes the radius of the first disk 406(1), and $\bar{r}$ includes a positive threshold constant.

Figure 5:
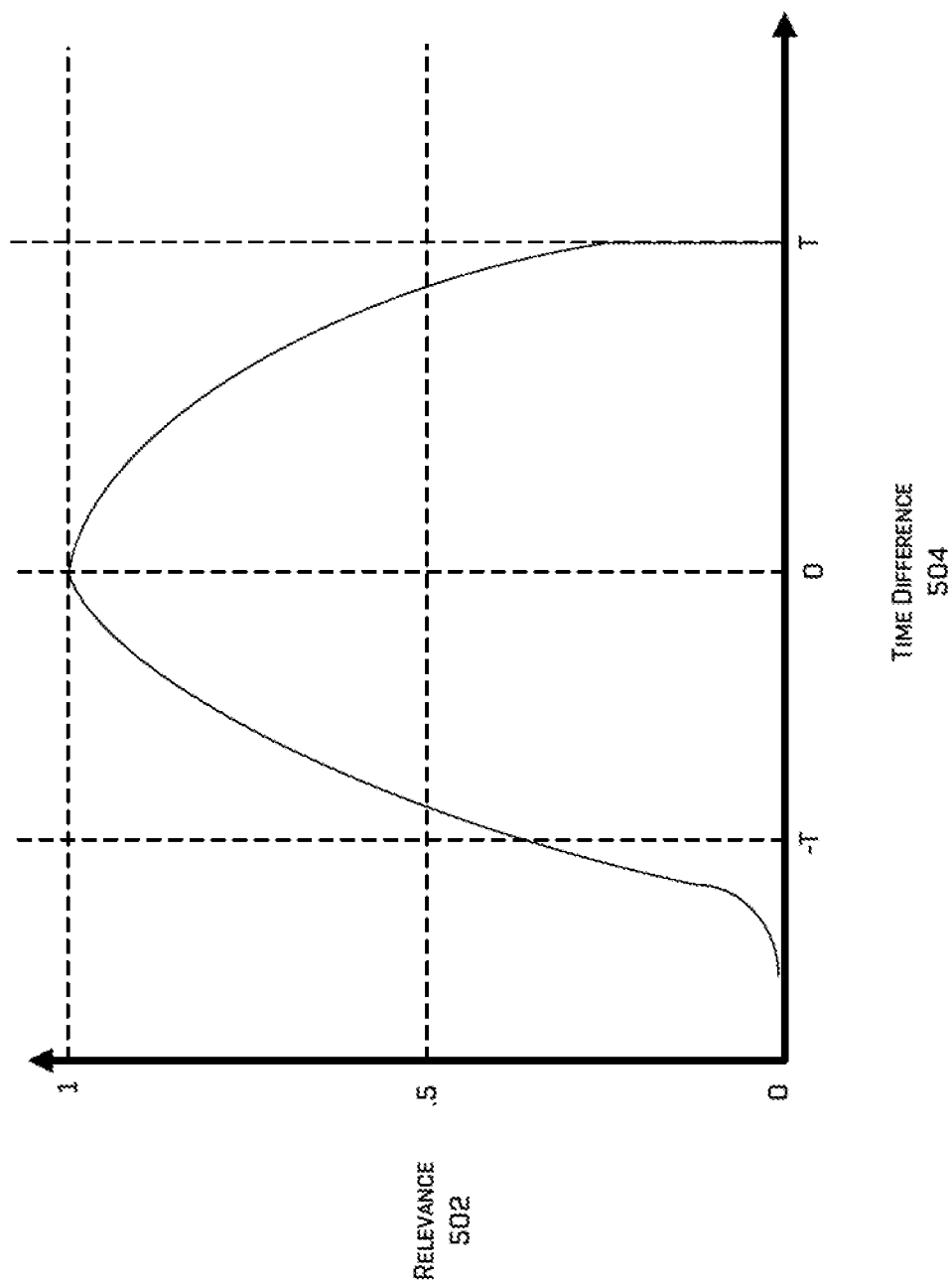
FIG. 5 illustrates an example of determining a relevance score associated with an interaction between objects.

As discussed herein, when the vehicle 102 determines that there is an interaction between two objects, the vehicle 102 may determine the relevance score associated with the interaction. As such, FIG. 5 illustrates an example of determining a relevance score associated with an interaction between objects. As shown, the example illustrates relevance scores 502 for different time differences 504 associated with a potential interaction.

As described herein, the relevance score 502 is determine by the time difference 504 between two objects arriving at a same location. In some examples, the relevance score 502 is configured to fall within a given range. In the example of FIG. 5, the range is between 0 and 1. However, in other examples, the range may include any other range, such as 0 to 10, 0 to 100, 0 to 1,000, and/or the like. Additionally, in some examples, and as illustrated by the example of FIG. 5, when the time difference 504 is close to 0 the relevance score is at a maximum. The relevance score 504 then decreases as the time difference increases both in the positive direction and the negative direction. Furthermore, in some examples, and as also illustrated in the example of FIG. 5, the relevance score 504 is at a minimum when the time difference is equal to or greater than a threshold, where the threshold is represented by −T and T. This is because the vehicle 102 determines that the object(s) are not relevant when the time difference is equal to or greater than a set time difference threshold.

However, in the example of FIG. 5, the vehicle 102 may still determine that the relevance score 502 is greater than the minimum relevance score 502 even when a negative time difference 504 is equal to or greater than the threshold time difference. This is because the object may still stop within the location and, as such, interact with the vehicle 102. However, the vehicle 102 may still determine that the relevance score 502 is equal to the minimum relevance score 502 when a positive time difference 504 is equal to or greater than the threshold time difference. This is because the vehicle 102 passes through the location before the object and, as such, the object cannot stop within the location before the vehicle 102 arrives.

The vehicle 102 may use one or more equations when determining the relevance score 502 associated with a potential interaction between objects. For example, and for a direct interaction between the vehicle 102 and an object, the vehicle 102 may determine the relevance score 502 based on the following equations:

$$R_{i,j} = \begin{cases} \cos\omega\Delta T, & \text{if } -T_{pred} \le \Delta T \le \overline{\Delta T} \\ 0, & \text{otherwise} \end{cases} \quad (3)$$

$$\omega = \frac{\pi}{T_{pred}} \quad (4)$$

In equation (3), $R_{i,j}$ includes the relevance score 502, $T_{pred}$ includes the prediction horizon, $\Delta T$ includes the time difference 504, and $T_{pred}$ represents the threshold time difference. Additionally, $\Delta T < 0$ when the object passes the location before the vehicle 102 and $\Delta T > 0$ when the vehicle 102 passes the location before the object.

In some examples, the vehicle 102 may perform similar processes in order to determine the relevance score for an indirect interaction. However, the vehicle 102 may use one or more additional properties when determining such a relevance score. For instance, the vehicle 102 may determine that the relevance score for an indirect interaction between two objects cannot be greater than the relevance score(s) for direct interaction(s) between the vehicle 102 and the object(s). For example, the vehicle 102 may determine that a first relevance score associated with a first direct interaction with a first object is 0.8, a second relevance score associated with a second direct interaction with a second object is 0.5, a third relevance score associated with a first indirect interaction between the first object and a third object is 0.9, and a second relevance score associated with a second indirect interaction between the second object and the third object is 0.4. In such an example, the vehicle 102 may determine that a final relevance score for the third object is the fourth relevance score of 0.4 even though the third relevance score is 0.9. This is because the third relevance score of 0.9 is greater than the first relevance score of 0.8.

While the example of FIG. 5 illustrates using a cosine curve to determine the relevance scores 502, in other examples, the vehicle 102 may use one or more additional and/or alternative equations. For a first example, the vehicle 102 may use a linear equation where the line starts at a relevance score 502 of 0 and a time difference 504 of −T, increases to the relevance score 502 of 1 and a time difference 504 of 0, and then decreases to the relevance score 502 of 0 and the time difference of +T. For a second example, the vehicle 102 may use a parabolic equation to determine the relevance scores 502 using the time differences 504. While these are just a couple of additional examples for determining the relevance scores 502, in other examples, the vehicle may still use additional and/or alternative equations.

Figure 6:
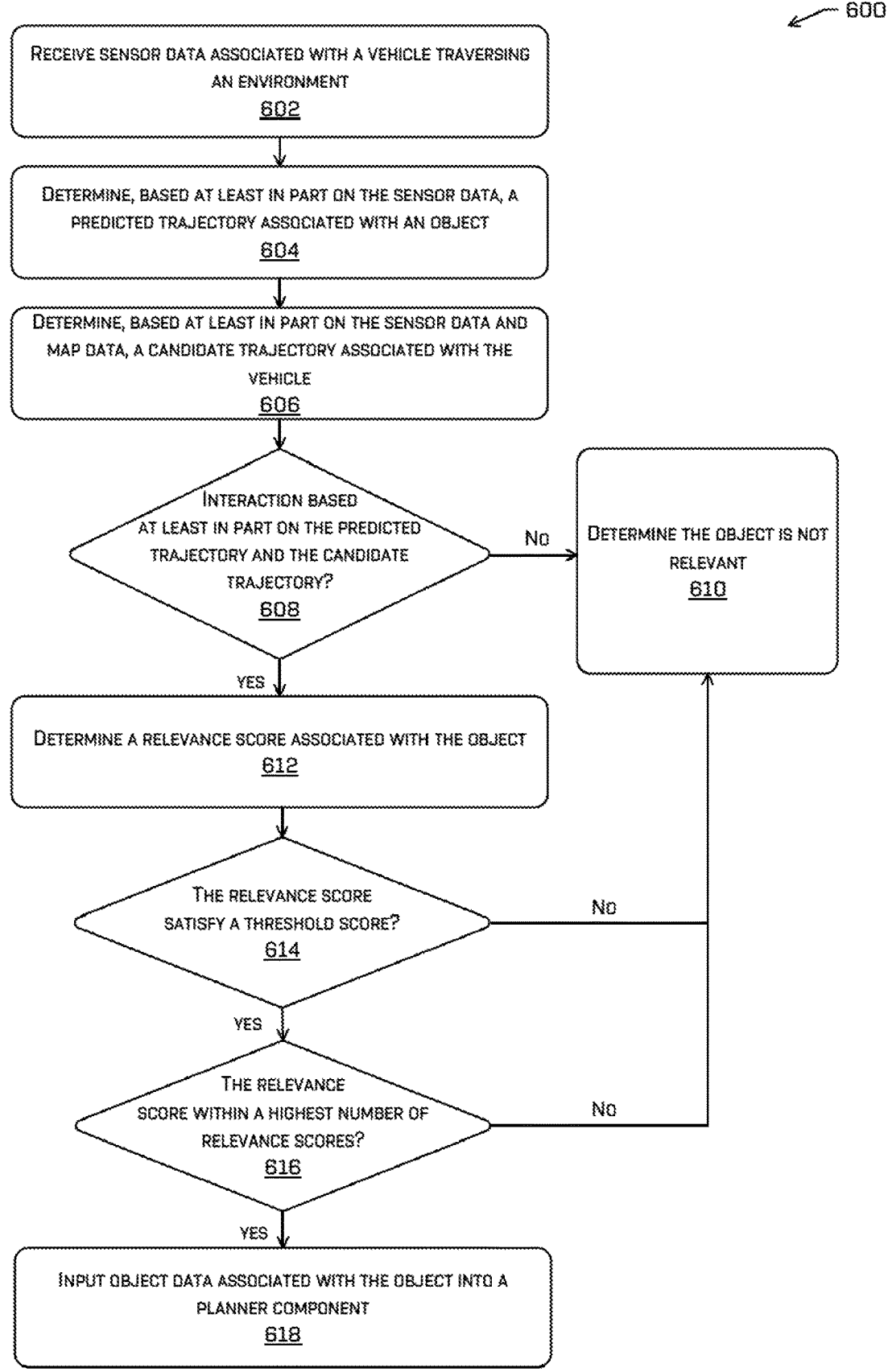
FIG. 6 is an example process for determining whether an object is relevant and, if the object is relevant, inputting data associated with the object into a planner component.
Figure 7:
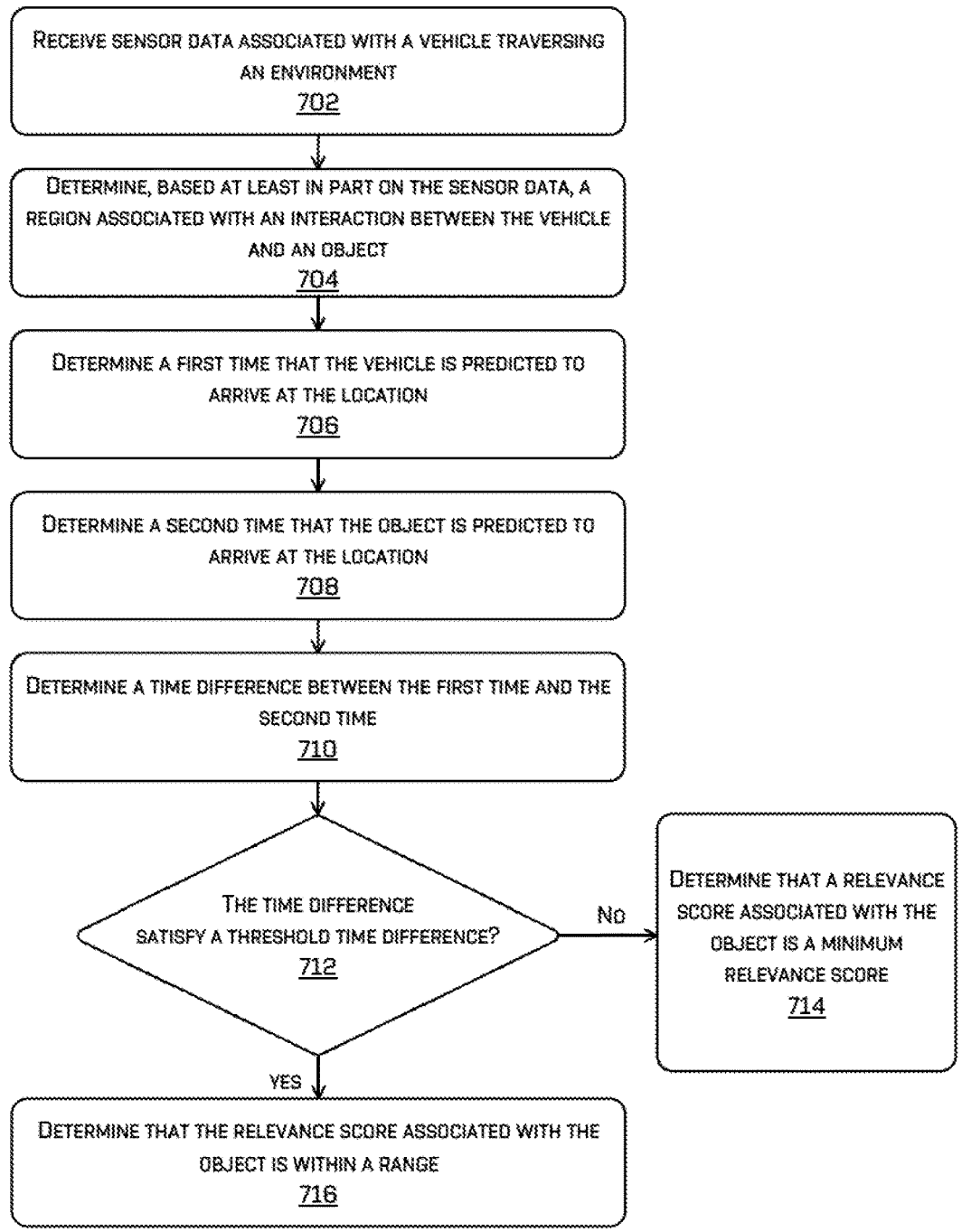
FIG. 7 is an example process for determining a relevance score associated with an object.
Figure 8:
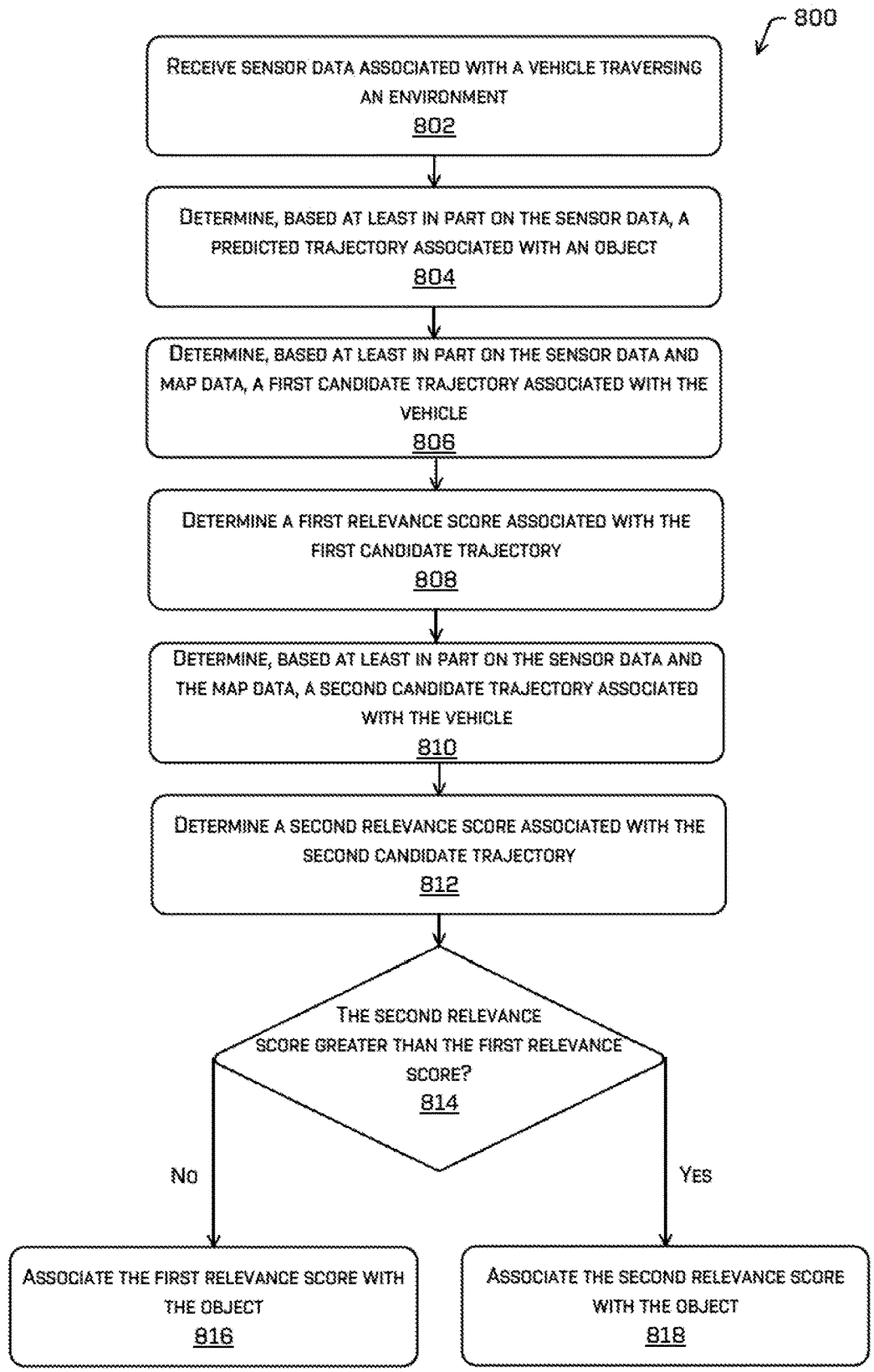
FIG. 8 is an example process for determining a relevance score associated with an object using multiple candidate trajectories associated with a vehicle.

FIGS. 6-8 illustrate example processes in accordance with examples of the disclosure. The process(es) are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 6 is an example process 600 for determining whether an object is relevant and, if the object is relevant, inputting data associated with the object into a planner component. At operation 602, the process 600 may include receiving sensor data associated with a vehicle traversing an environment and at operation 604, the process 600 may include determining, based at least in part on the sensor data, a predicted trajectory associated with an object. For instance, the vehicle 102 may receive the sensor data, such as from one or more sensors of the vehicle 102. The vehicle 102 may then analyze the sensor data using a perception component in order to determine object data associated with the object. The object data may include, but is not limited to, position data, orientation data, heading data, velocity data, speed data, acceleration data, yaw rate data, turning rate data, and/or the like associated with the object. The vehicle 102 may then analyze the object data using a prediction component in order to determine the predicted trajectory associated with the object.

At operation 606, the process 600 may include determining, based at least in part on the sensor data and map data, a candidate trajectory associated with the vehicle. For instance, the vehicle 102 (e.g., the trajectory component) may analyze the sensor data and the map data to determine the candidate trajectory of the vehicle 102. When determining the candidate trajectory, the vehicle 102 may determine a velocity of the vehicle 102 using one or more factors. For example, the vehicle 102 may determine the velocity using a speed limit when the vehicle 102 is not following another vehicle or, if the vehicle 102 is following another vehicle, the vehicle 102 may use the velocity of the other vehicle. Additionally, in some examples, such as when the vehicle 102 is traversing on a roadway that includes more than one lane, the vehicle 102 may determine a respective candidate trajectory associated with each lane of the roadway.

At operation 608, the process 600 may include determining whether there is an interaction based at least in part on the predicted trajectory and the candidate trajectory. For instance, the vehicle 102 may analyze the predicted trajectory and the candidate trajectory to determine whether there is an interaction between the vehicle 102 and the object. As described herein, the vehicle 102 may determine that there is the interaction when the vehicle 102 is within a threshold distance to the object. Additionally, the vehicle 102 may determine that there is no interaction when the vehicle 102 does not get within the threshold distance to the object. If, at operation 608, it is determined that there is no interaction, then at operation 610, the process 600 may include determining that the object is not relevant. For instance, if the vehicle 102 determines that there is no interaction, then the vehicle 102 may determine that the object is not relevant.

However, if at operation 608, it is determined that there is the interaction, then at operation 612, the process 600 may include determining a relevance score associated with the object. For instance, if the vehicle 102 determines that there is the interaction between the vehicle 102 and the object, then the vehicle 102 may determine the relevance score associated with the object. In some examples, to determine the relevance score, the vehicle 102 may determine a time difference between a time when the vehicle 102 is predicted to arrive at a location associated with the interaction and a time when the object is predicted to arrive at the location. The vehicle 102 may then determine the relevance score using the time difference. Additionally, in some examples, if the time difference is negative, such that the object is predicted to arrive at the location before the vehicle 102, the vehicle 102 may determine a higher relevance score.

At operation 614, the process 600 may include determining whether the relevance score satisfies a threshold score. For instance, the vehicle 102 may determine whether the relevance score is equal to or greater than the threshold score. If, at operation 614, it is determined that the relevance score does not satisfy the threshold score, then again at operation 610, the process 600 may include determining that the object is not relevant. For instance, if the vehicle 102 determines that the relevance score is less than the threshold score, then the vehicle 102 may determine that the object is not relevant.

However, if, at operation 614, it is determined that the relevance score does satisfy the threshold score, then at operation 616, the process 600 may include determining whether the relevance score is within a highest number of relevance scores. For instance, the vehicle 102 may select a threshold number of objects that include the highest relevance scores. The threshold number may include, but is not limited to, 10 objects, 20 objects, 50 objects, 100 objects, and/or any other number objects. As such, the vehicle 102 may determine whether the relevance score is within the highest number of relevance scores. If, at operation 616, it is determined that the relevance score is not within the highest number of relevance scores, then again at operation 610, the process 600 may include determining that the object is not relevance. For instance, if the vehicle 102 determines that the relevance score is not within the highest number of relevance scores, then the vehicle 102 may again determine that the object is not relevant.

However, if, at operation 616, it is determined that the relevance score is within the highest number of relevance scores, then at operation 618, the process 600 may include inputting object data associated with the object into a planner component. For instance, if the vehicle 102 determines that the relevance score is within the highest number of relevance scores, then the vehicle 102 may determine that the object is relevant. As such, the vehicle 102 may input the object data associated with the object into the planner component. The vehicle 102 may then determine an action to perform based on an output from the planner component.

FIG. 7 is an example process 700 for determining a relevance score associated with an object. At operation 702, the process 700 may include receiving sensor data associated with a vehicle traversing an environment and at operation 704, the process 700 may include determining, based at least in part on the sensor data, a location associated with an interaction between the vehicle and an object. For instance, the vehicle 102 may receive the sensor data, such as from one or more sensors of the vehicle 102. The vehicle 102 may then analyze the sensor data to determine a candidate trajectory associated with the vehicle 102 and a predicted trajectory associated with the object. Using the candidate trajectory and the predicted trajectory, the vehicle 102 may determine the location associated with the interaction, where the location is along the candidate trajectory and the predicted trajectory.

At operation 706, the process 700 may include determining a first time that the vehicle is predicted to arrive at the location and at operation 708, the process 700 may include determining a second time that the object is predicted to arrive at the location. For instance, the vehicle 102 may use the candidate trajectory and a velocity associated with the vehicle 102 to determine the first time that the vehicle 102 is predicted to arrive at the location. The vehicle 102 may determine the velocity associated with the vehicle 102 based on a velocity associated with another vehicle that the vehicle 102 is following, a speed limit, and/or the like. Additionally, the vehicle 102 may use the predicted trajectory and a velocity associated with the object to determine a second time that the object is predicted to arrive at the location.

At operation 710, the process 700 may include determining a time difference between the first time and the second time and at operation 712, the process 700 may include determining whether the time difference satisfies a threshold time difference. For instance, the vehicle 102 may determine the time difference between the first time and the second time. The vehicle 102 may then compare the time difference to the threshold time difference in order to determine whether the time difference satisfies (e.g., is less than or equal to) the threshold time difference. If, at operation 712, it is determined that the time difference does not satisfy the threshold time difference, then at operation 714, the process 700 may include determining that a relevance score associated with the object is a minimum relevance score. For instance, if the vehicle 102 determines that the time difference does not satisfy (e.g., is greater than) the threshold time difference, then the vehicle 102 may determine that the relevance score associated with the object is the minimum relevance score.

However, if, at operation 712, it is determined that the time difference does satisfy the threshold time difference, then at operation 716, the process 700 may include determining that the relevance score associated with the object is within a range. For instance, if the vehicle 102 determines that the time difference does satisfy the threshold time difference, then the vehicle 102 may determine that the relevance score associated with the object is within the range. As described herein, the vehicle 102 may determine that the relevance score is greater when the time difference is small and determine that the relevance score is lower when the time difference is large.

FIG. 8 is an example process 800 for determining a relevance score associated with an object using multiple candidate trajectories associated with a vehicle. At operation 802, the process 800 may include receiving sensor data associated with a vehicle traversing an environment and at operation 804, the process 800 may include determining, based at least in part on the sensor data, a predicted trajectory associated with an object. For instance, the vehicle 102 may receive the sensor data, such as from one or more sensors of the vehicle 102. The vehicle 102 may then analyze the sensor data using a perception component in order to determine object data associated with the object. The object data may include, but is not limited to, position data, orientation data, heading data, velocity data, speed data, acceleration data, yaw rate data, turning rate data, and/or the like associated with the object. The vehicle 102 may then analyze the object data using a prediction component in order to determine the predicted trajectory associated with the object.

At operation 806, the process 800 may include determining, based at least in part on the sensor data and map data, a first candidate trajectory associated with the vehicle and at operation 808, the process 800 may include determining a first relevance score associated with the first candidate trajectory. For instance, the vehicle 102 (e.g., the trajectory component) may analyze the sensor data and the map data to determine the first candidate trajectory associated with the vehicle 102. In some examples, the first candidate trajectory is associated with a first lane of a roadway. In some examples, the first candidate trajectory is associated with a first velocity. The vehicle 102 may then determine that there is a first interaction between the vehicle 102 and the object using the first candidate trajectory and the predicted trajectory. Based on the first interaction, the vehicle 102 may determine the first relevance score associated with the first candidate trajectory.

At operation 810, the process 800 may include determining, based at least in part on the sensor data and the map data, a second candidate trajectory associated with the vehicle and at operation 812, the process 800 may include determining a second relevance score associated with the second candidate trajectory. For instance, the vehicle 102 (e.g., the trajectory component) may analyze the sensor data and the map data to also determine the second candidate trajectory associated with the vehicle 102. In some examples, the second candidate trajectory is associated with a second lane of the roadway. In some examples, the second candidate trajectory is associated with a second velocity. The vehicle 102 may then determine that there is a second interaction between the vehicle 102 and the object using the second candidate trajectory and the predicted trajectory. Based on the second interaction, the vehicle 102 may determine the second relevance score associated with the second candidate trajectory. In other words, the vehicle 102 may determine both the first relevance score and the second relevance score that are both associated with the same object.

At operation 814, the process 800 may include determining whether the second relevance score is greater than the first relevance score. For instance, the vehicle 102 may compare the second relevance score to the first relevance score to determine whether the second relevance score is greater than the first relevance score. If, at operation 814, it is determined that the second relevance score is not greater than the first relevance score, then at operation 816, the process 800 may include associating the first relevance score with the object. For instance, if the vehicle 102 determines that the second relevance score is less than the first relevance score, then the vehicle 102 may associate with the first relevance score with the object.

However, if, at operation 814, it is determined that the second relevance score is greater than the first relevance score, then at operation 818, the process 800 may include associating the second relevance score with the object. For instance, if the vehicle 102 determines that the second relevance score is greater than the first relevance score, then the vehicle 102 may associate with the second relevance score with the object. In other words, the vehicle 102 may associate with highest relevance score with the object.

Figure 9:
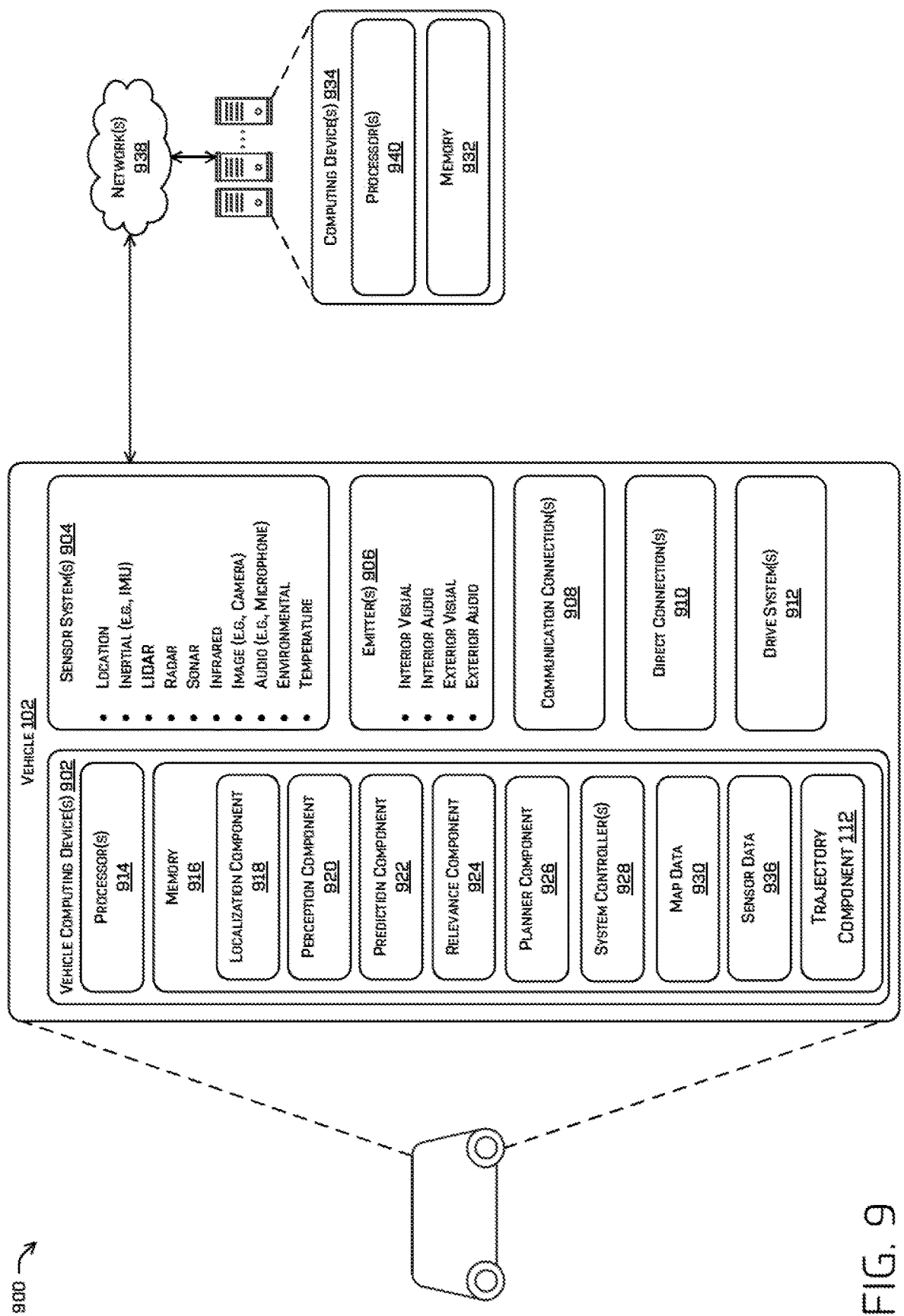
FIG. 9 is a block diagram of an example system for implementing the techniques described herein.

FIG. 9 is a block diagram of an example system 900 for implementing the techniques described herein. In at least one example, the system 900 may include a vehicle, such as vehicle 102.

The vehicle 102 may include one or more vehicle computing devices 902, one or more sensor systems 904, one or more emitters 906, one or more communication connections 908, at least one direct connection 910, and one or more drive systems 912.

The vehicle computing device 902 may include one or more processors 914 and memory 916 communicatively coupled with the processor(s) 914. In the illustrated example, the vehicle 102 is an autonomous vehicle; however, the vehicle 102 could be any other type of vehicle, such as a semi-autonomous vehicle, or any other system having at least an image capture device (e.g., a camera enabled smartphone). In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification.

In the illustrated example, the memory 916 of the vehicle computing device 902 stores a localization component 918, a perception component 920, a prediction component 922, a relevance component 924, a planner component 926, the trajectory component 112, one or more system controllers 928, and one or more maps (represented by map data 930. Though depicted in FIG. 9 as residing in the memory 916 for illustrative purposes, it is contemplated that the localization component 918, the perception component 920, the prediction component 922, the relevance component 924, the planner component 926, the trajectory component 112, system controller(s) 928, and/or the map(s) may additionally, or alternatively, be accessible to the vehicle 102 (e.g., stored on, or otherwise accessible by, memory remote from the vehicle 102, such as, for example, on memory 932 of one or more remote computing device 934).

In at least one example, the localization component 918 may include functionality to receive sensor data 936 from the sensor system(s) 904 to determine a position and/or orientation of the vehicle 102 (e.g., one or more of an x-, y-, z-position, roll, pitch, or yaw). For example, the localization component 918 may include and/or request receive a map of an environment, such as from map(s) 930, and may continuously determine a location and/or orientation of the vehicle 102 within the environment. In some instances, the localization component 918 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 102. In some instances, the localization component 918 may provide data to various components of the vehicle 102 to determine an initial position of the vehicle 102 for determining the relevance of an object to the vehicle 102, as discussed herein.

In some instances, the perception component 920 (which may represent, and/or include, the perception component 106) may include functionality to perform object detection, segmentation, and/or classification. In some examples, the perception component 920 may provide processed sensor data 936 that indicates a presence of an object (e.g., entity) that is proximate to the vehicle 102 and/or a classification of the object as an object type (e.g., car, pedestrian, cyclist, animal, building, tree, road surface, curb, sidewalk, unknown, etc.). In some examples, the perception component 920 may provide processed sensor data 936 that indicates a presence of a stationary entity that is proximate to the vehicle 102 and/or a classification of the stationary entity as a type (e.g., building, tree, road surface, curb, sidewalk, unknown, etc.). In additional or alternative examples, the perception component 920 may provide processed sensor data 936 that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 922 (which may represent, and/or include, the prediction component 114) may generate one or more probability maps representing prediction probabilities of possible locations of one or more objects in an environment. For example, the prediction component 922 may generate one or more probability maps for vehicles, pedestrians, animals, and the like within a threshold distance from the vehicle 102. In some instances, the prediction component 922 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 922 may generate predicted trajectories of objects (e.g., objects) in an environment. For example, the prediction component 922 may generate one or more predicted trajectories for objects within a threshold distance from the vehicle 102. In some examples, the prediction component 922 may measure a trace of an object and generate a trajectory for the object based on observed and predicted behavior.

The relevance component 924 may be configured to determine, using one or more of the processes described herein, relevance scores associated with objects located within the environment. For example, the relevance component 924 may be configured to determine the relevance scores associated with objects that include direct interactions with the vehicle 102 using at least time differences between times when the vehicle 102 arrives at given location and times when the objects arrive at the locations. Additionally, the relevance component 924 may be configured to determine relevance scores associated with objects that include indirect interactions with the vehicle 102 using at least time differences between times when first objects arrive at given locations and times when second objects arrive at the locations.

The relevance component 924 may further be configured to analyze, using one or more of the processes described herein, the relevance scores in order to determine which object(s) are relevant to the vehicle 102. For example, the relevance component 924 may determine that object(s) are relevant when the relevant score(s) associated with the object(s) satisfy a threshold relevance score. Additionally, or alternatively, the relevance component 924 may be determine that object(s) are relevant when the object(s) are associated with relevance score(s) that are included in the highest threshold number of relevance scores.

In general, the planner component 926 (which may represent, and/or include, the planner component 126) may determine a path for the vehicle 102 to follow to traverse through an environment. For example, the planner component 926 may determine various routes and trajectories and various levels of detail. For example, the planner component 926 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 926 may generate an instruction for guiding the vehicle 102 along at least a portion of the route from the first location to the second location. In at least one example, the planner component 926 may determine how to guide the vehicle 102 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 926 may select a trajectory for the vehicle 102 based at least in part on receiving data representing an output of the trajectory component 112.

In other examples, the planner component 926 may alternatively, or additionally, use data from the localization component 918, the perception component 920, and/or the prediction component 922 to determine a path for the vehicle 102 to follow to traverse through an environment. For example, the planner component 926 may receive data (e.g., object data) from the localization component 918, the perception component 920, and/or the prediction component 922 regarding objects associated with an environment. In some examples, the planner component 926 receives data for relevant objects within the environment. Using this data, the planner component 926 may determine a route to travel from a first location (e.g., a current location) to a second location (e.g., a target location) to avoid objects in an environment. In at least some examples, such a planner component 926 may determine there is no such collision free path and, in turn[1], provide a path which brings vehicle 102 to a safe stop avoiding all collisions and/or otherwise mitigating damage.

In at least one example, the vehicle computing device 902 may include one or more system controllers 928, which may be configured to control steering, propulsion, braking, safety, emitters, communication, and other systems of the vehicle 102. The system controller(s) 928 may communicate with and/or control corresponding systems of the drive system(s) 912 and/or other components of the vehicle 102.

The memory 916 may further include one or more maps 930 that may be used by the vehicle 102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 102 may be controlled based at least in part on the map(s) 930. That is, the map(s) 930 may be used in connection with the localization component 918, the perception component 920, the prediction component 922, and/or the planner component 926 to determine a location of the vehicle 102, detect objects in an environment, generate routes, determine actions and/or trajectories to navigate within an environment.

In some examples, the one or more maps 930 may be stored on a remote computing device(s) (such as the computing device(s) 934) accessible via network(s) 938. In some examples, multiple maps 930 may be stored based on, for example, a characteristic (e.g., type of entity, time of day, day of week, season of the year, etc.). Storing multiple maps 930 may have similar memory requirements, but increase the speed at which data in a map may be accessed.

In some instances, aspects of some or all of the components discussed herein may include any models, techniques, and/or machine learned techniques. For example, in some instances, the components in the memory 916 (and the memory 932, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 904 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 904 may include multiple instances of each of these or other types of sensors. For instance, the lidar sensors may include individual lidar sensors located at the corners, front, back, sides, and/or top of the vehicle 102. As another example, the camera sensors may include multiple cameras disposed at various locations about the exterior and/or interior of the vehicle 102. The sensor system(s) 904 may provide input to the vehicle computing device 902. Additionally, or in the alternative, the sensor system(s) 904 may send sensor data, via the one or more networks 938, to the one or more computing device(s) 436 at a particular frequency, after a lapse of a predetermined period of time, in near real-time, etc.

The vehicle 102 may also include one or more emitters 906 for emitting light and/or sound. The emitter(s) 906 may include interior audio and visual emitters to communicate with passengers of the vehicle 102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 906 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 may also include one or more communication connections 908 that enable communication between the vehicle 102 and one or more other local or remote computing device(s). For instance, the communication connection(s) 908 may facilitate communication with other local computing device(s) on the vehicle 102 and/or the drive system(s) 912. Also, the communication connection(s) 908 may allow the vehicle to communicate with other nearby computing device(s) (e.g., remote computing device 934, other nearby vehicles, etc.) and/or one or more remote sensor system(s) for receiving sensor data. The communications connection(s) 908 also enable the vehicle 102 to communicate with a remote teleoperations computing device or other remote services.

The communications connection(s) 908 may include physical and/or logical interfaces for connecting the vehicle computing device 902 to another computing device or a network, such as network(s) 938. For example, the communications connection(s) 908 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 may include one or more drive systems 912. In some examples, the vehicle 102 may have a single drive system 912. In at least one example, if the vehicle 102 has multiple drive systems 912, individual drive systems 912 may be positioned on opposite ends of the vehicle 102 (e.g., the front and the rear, etc.). In at least one example, the drive system(s) 912 may include one or more sensor systems to detect conditions of the drive system(s) 912 and/or the surroundings of the vehicle 102. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 912. In some cases, the sensor system(s) on the drive system(s) 912 may overlap or supplement corresponding systems of the vehicle 102 (e.g., sensor system(s) 904).

The drive system(s) 912 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 912 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 912. Furthermore, the drive system(s) 912 may also include one or more communication connection(s) that enable communication by the respective drive module with one or more other local or remote computing device(s).

In at least one example, the direct connection 910 may provide a physical interface to couple the one or more drive system(s) 912 with the body of the vehicle 102. For example, the direct connection 910 may allow the transfer of energy, fluids, air, data, etc. between the drive system(s) 912 and the vehicle. In some instances, the direct connection 910 may further releasably secure the drive system(s) 912 to the body of the vehicle 102.

In at least one example, the localization component 918, the perception component 920, the prediction component 922, the relevance component 924, the planner component 926, the one or more system controllers 928, and the one or more maps 430 may process sensor data 936, as described above, and may send their respective outputs, over the one or more network(s) 938, to the computing device(s) 934. In at least one example, the localization component 918, the perception component 920, the prediction component 922, the relevance component 924, the planner component 926, the one or more system controllers 928, and the one or more maps 430 may send their respective outputs to the remote computing device(s) 934 at a particular frequency, after a lapse of a predetermined period of time, in near real-time, etc.

In some examples, the vehicle 102 may send sensor data 936 to the computing device(s) 934 via the network(s) 938. In some examples, the vehicle 102 may receive sensor data 936 from the computing device(s) 934 and/or remote sensor system(s) via the network(s) 938. The sensor data 936 may include raw sensor data and/or processed sensor data and/or representations of sensor data. In some examples, the sensor data 936 (raw or processed) may be sent and/or received as one or more log files.

The computing device(s) 934 may include processor(s) 940 and a memory 932. In some examples, the memory 932 may store one or more of components that are similar to the component(s) stored in the memory 916 of the vehicle 102. In such examples, the computing device(s) 934 may be configured to perform one or more of the processes described herein with respect to the vehicle 102.

The processor(s) 914 of the vehicle 102 and the processor(s) 940 of the computing device(s) 934 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 916 and memory 932 are examples of non-transitory computer-readable media. The memory 916 and memory 932 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 9 is illustrated as a distributed system, in alternative examples, components of the vehicle 102 may be associated with the computing device(s) 934 and/or components of the computing device(s) 934 may be associated with the vehicle 102. That is, the vehicle 102 may perform one or more of the functions associated with the computing device(s) 934, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A: A system comprising: one or more processors; and one or more computer-readable media storing instruction that, when executed by the one or more processors, cause the one or more processors to perform operations comprising: receiving sensor data from a sensor of an autonomous vehicle; determining, based at least in part the sensor data, a predicted trajectory associated with an object represented in the senor data; determining, using a trajectory component and based at least in part on map data and a portion of the sensor data, a candidate trajectory of the autonomous vehicle; determining that the candidate trajectory associated with the autonomous vehicle intersects with the predicted trajectory associated with the object; determining, based at least in part on the candidate trajectory intersecting with the predicted trajectory, a relevance score associated with the object; based at least in part on the relevance score, inputting object data representing the object into a planner component; determining, using the planner component, an action for the autonomous vehicle to perform; and causing the autonomous vehicle to perform the action.

B: The system of Paragraph A, the operations further comprising: determining a location at which the candidate trajectory associated with the autonomous vehicle intersects with the predicted trajectory associated with the object; determining a first time that the autonomous vehicle is predicted to navigate through the location; determining a second time that the object is predicted to navigate through the location; and determining a time difference between the first time and the second time, wherein determining the relevance score is based at least in part on the time difference.

C: The system of in Paragraph A or Paragraph B, the operations further comprising: determining that the relevance score is equal to or greater than a threshold score, wherein inputting the object data into the planner component is based at least in part on the relevance score being equal to or greater than the threshold score.

D: The system of any one of Paragraphs A-C, wherein the object is a first object, the predicted trajectory is a first predicted trajectory, and the relevance score is a first relevance score, and wherein the operations further comprise: determining, based at least in part on the sensor data, a second predicted trajectory associated with a second object; determining that the candidate trajectory associated with autonomous vehicle intersects with the second predicted trajectory associated with the second object; determining, based at least in part on the candidate trajectory intersecting with the second predicted trajectory, a second relevance score associated with the second object; and determining that the first relevance score is greater than the second relevance score, wherein inputting the object data into the planner component is based at least in part on the first relevance score being greater than the second relevance score.

E: The system of any one of Paragraphs A-D, wherein determining that the candidate trajectory intersects with the predicted trajectory comprises: representing the autonomous vehicle as at least a first disk having a first center and a second disk having a second center; representing the object as at least a third disk having a third center and a fourth disk having a fourth center; determining, based at least in part on the candidate trajectory and the predicted trajectory, a closes distance between at least one of the first center or the second center and at least one of the third center or the fourth center; and determining that the closest distance is less than a threshold distance.

F: One or more non-transitory computer-readable media storing instructions that, when executed by one or more processors, cause the one or more processors to perform operations comprising: receiving sensor data from a sensor associated with a vehicle; determining, based at least in part on the sensor data, a predicted trajectory associated with an object; determining, using a first component and based at least in part on map data, a candidate trajectory associated with the vehicle; determining, based at least in part on the predicted trajectory and the candidate trajectory, that there is an interaction associated with the vehicle and the object; determining, based at least in part on the interaction, a relevance score associated with the object; based at least in part on the relevance score, inputting object data representing the object into a second component; and determining, using the second component, an action for the vehicle to perform, wherein the first component requires fewer computational resources than the second component.

G: The one or more non-transitory computer-readable media of Paragraph F, the operations further comprising: determining a location at which the candidate trajectory associated with the vehicle intersects with the predicted trajectory associated with the object; determining a first time that the vehicle is predicted to navigate through the location; determining a second time that the object is predicted to navigate through the location; and determining a time difference between the first time and the second time, wherein determining the relevance score is based at least in part on the time difference.

H: The one or more non-transitory computer-readable media of Paragraph G, wherein determining the location comprises: analyzing the candidate trajectory using time steps to determine candidate future locations associated with the vehicle; analyzing the predicted trajectory using the time steps to determine predicted future locations; and determining that a candidate future location from the candidate future locations and a predicted future location from the predicted future locations intersect at the location.

I: The one or more non-transitory computer-readable media of any one of Paragraphs F-H, wherein the object is a first object, the predicted trajectory is a first predicted trajectory, the interaction is a first interaction, and the relevance score is a first relevance score, and wherein the operations further comprise: determining, based at least in part on the sensor data, a second predicted trajectory associated with a second object; determining, based at least in part on the second predicted trajectory and the candidate trajectory, that there is a second interaction between the vehicle and the second object; determining, based at least in part on the second interaction, a second relevance score associated with the second object; and determining that the first relevance score is greater than the second relevance score, wherein inputting the object data into the second component is based at least in part on the first relevance score being greater than the second relevance score.

J: The one or more non-transitory computer-readable media of any one of Paragraphs F-I, the operations further comprising: determining a plurality of relevance scores associated with a plurality of objects; and determining a threshold number of the plurality of object based at least in part on the plurality of relevance score, the threshold number of the plurality of objects including at least the object.

K: The one or more non-transitory computer-readable media of any one of Paragraphs F-J, wherein determining that there is the interaction between the vehicle and the object comprises: determining, based at least in part on the candidate trajectory and the predicted trajectory, a distance between the vehicle and the object at a future time; and determining that the distance is less than a threshold distance.

L: The one or more non-transitory computer-readable media of Paragraph K, the operations further comprising determining the threshold distance based at least in part on at least one of: a candidate velocity associated with the vehicle; a predicted velocity associated with the object; or a classification associated with the object.

M: The one or more non-transitory computer-readable media of any one of Paragraphs F-L wherein the object is a first object, the predicted trajectory is a first predicted trajectory, the interaction is a first interaction, the relevance score is a first relevance score, and the object data is first object data, and wherein the operations further comprise: determining, based at least in part on the sensor data, a second predicted trajectory associated with a second object; determining, based at least in part on the first predicted trajectory associated with the first object and the second predicted trajectory associated with the second object, a second interaction between the first object and the second object; determining, based at least in part on the second interaction, a second relevance score associated with the second object; and based at least in part on the second relevance score, inputting second object data associated with the second object into the second component.

N: The one or more non-transitory computer-readable media of any one of Paragraphs F-M, wherein the object is a first object, the predicted trajectory is a first predicted trajectory, the interaction is a first interaction, the relevance score is a first relevance score, and the object data is first object data, and wherein the operations further comprise: determining, based at least in part on the sensor data, a second predicted trajectory associated with a second object; determining, based at least in part on the second predicted trajectory and the candidate trajectory, that there is a second interaction between the vehicle and the second object; determining, based at least in part on the second interaction, a second relevance score associated with the second object; and based at least in part on the second relevance score, refraining from inputting second object data associated with the second object into the planner component.

O: The one or more non-transitory computer-readable media of any one of Paragraphs F-N, wherein candidate trajectory is a first candidate trajectory, the interaction is a first interaction, and the relevance score is a first relevance score, and wherein the operations further comprise: determining, using the first component and based at least in part on map data and the sensor data, a second candidate trajectory associated with the vehicle; determining, based at least in part on the predicted trajectory and the second candidate trajectory, that there is a second interaction between the vehicle and the object; determining, based at least in part on the second interaction, a second relevance score associated with the object; determining that the first relevance score is greater than the second relevance score; and associating the first relevance score with the object based at least in part on the first relevance score being greater than the second relevance score.

P: The one or more non-transitory computer-readable media of any one of Paragraphs F-O, wherein the object is a first object, and wherein the operations further comprise: determining that a second object is located along the first candidate trajectory; determining, based at least in part on a velocity associated with the second object, a first candidate velocity associated with the first candidate trajectory; and determining, based at least in part on a speed limit, a second candidate velocity associated with the second candidate trajectory.

Q: The one or more non-transitory computer-readable media of any one of Paragraphs F-P, wherein determining the relevance score associated with the object comprises: determining a location at which the candidate trajectory associated with the vehicle intersects with the predicted trajectory associated with the object; determining a first time that the vehicle is predicted to navigate through the location; determining a second time that the object is predicted to navigate through the location; determining a time difference between the first time and the second time; and determining the relevance score based at least in part on a function of the time difference and cosine.

R: A method comprising: receiving sensor data from sensor associated with a vehicle; determining, based at least in part on the sensor data, a predicted trajectory associated with an object; determining, using a first component and based at least in part on map data, a candidate trajectory associated with the vehicle; determining, based at least in part on the predicted trajectory and the candidate trajectory, that there is an interaction between the vehicle and the object; determining, based at least in part on the interaction, a relevance score associated with the object; based at least in part on the relevance score, inputting object data representing the object into a second component; and determining, using the second component, an action for the vehicle to perform.

S: The method of Paragraph R, further comprising: determining a location at which the candidate trajectory associated with the vehicle intersects with the predicted trajectory associated with the object; determining a first time that the vehicle is predicted to navigate through the location; determining a second time that the object is predicted to navigate through the location; and determining a time difference between the first time and the second time, wherein determining the relevance score is based at least in part on the time difference.

T: The method of Paragraph R or Paragraph S, further comprising: determining a plurality of relevance scores associated with a plurality of objects; and determining a threshold number of the plurality of object based at least in part on the plurality of relevance score, the threshold number of the plurality of objects including at least the object.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions that, when executed by the one or more processors, cause the one or more processors to perform operations comprising:
receiving sensor data from a sensor of an autonomous vehicle;
determining, based at least in part on the sensor data, a predicted trajectory associated with an object represented in the sensor data;
determining, using a trajectory component and based at least in part on map data and a portion of the sensor data, a candidate trajectory associated with the autonomous vehicle;
determining that the candidate trajectory associated with the autonomous vehicle intersects with the predicted trajectory associated with the object;
determining, based at least in part on the candidate trajectory intersecting with the predicted trajectory, a relevance score associated with the object;
determining, based at least in part on the predicted trajectory, a potential interaction between the object and an additional object;
determining, based at least in part on the potential interaction, to modify the relevance score;
based at least in part on the relevance score, inputting object data representing the object into a planner component;
determining, using the planner component, an action for the autonomous vehicle to perform; and
causing the autonomous vehicle to perform the action.

2. The system of claim 1, the operations further comprising:
determining a location at which the candidate trajectory associated with the autonomous vehicle intersects with the predicted trajectory associated with the object;
determining a first time that the autonomous vehicle is predicted to navigate through the location;
determining a second time that the object is predicted to navigate through the location; and
determining a time difference between the first time and the second time,
wherein determining the relevance score is based at least in part on the time difference.

3. The system of claim 1, the operations further comprising:
determining that the relevance score is equal to or greater than a threshold score,
wherein inputting the object data into the planner component is based at least in part on the relevance score being equal to or greater than the threshold score.

4. The system of claim 1, wherein the object is a first object, the predicted trajectory is a first predicted trajectory, and the relevance score is a first relevance score, and wherein the operations further comprise:
determining, based at least in part on the sensor data, a second predicted trajectory associated with a second object;
determining that the candidate trajectory associated with the autonomous vehicle intersects with the second predicted trajectory associated with the second object;
determining, based at least in part on the candidate trajectory associated with the autonomous vehicle intersecting with the second predicted trajectory, a second relevance score associated with the second object; and
determining that the first relevance score is greater than the second relevance score,
wherein inputting the object data into the planner component is based at least in part on the first relevance score being greater than the second relevance score.

5. The system of claim 1, wherein determining that the candidate trajectory intersects with the predicted trajectory comprises:
representing the autonomous vehicle as at least a first disk having a first center and a second disk having a second center;
representing the object as at least a third disk having a third center and a fourth disk having a fourth center;
determining, based at least in part on the candidate trajectory and the predicted trajectory, a closest distance between at least one of the first center or the second center and at least one of the third center or the fourth center; and
determining that the closest distance is less than a threshold distance.

6. One or more non-transitory computer-readable media storing instructions that, when executed by one or more processors, cause the one or more processors to perform operations comprising:
receiving sensor data from a sensor associated with a vehicle;
determining, based at least in part on the sensor data, a predicted trajectory associated with an object;
determining, based at least in part on the sensor data, an additional predicted trajectory associated with an additional object;
determining, using a first component and based at least in part on map data, a candidate trajectory associated with the vehicle;
determining, based at least in part on the predicted trajectory, the additional predicted trajectory, and the candidate trajectory, that there is one or more of a direct interaction associated with the vehicle and the object or a interaction associated with the object and the additional object;
determining, based at least in part on the one or more of the direct interaction or the potential interaction, a relevance score associated with the object;
based at least in part on the relevance score, inputting object data representing the object into a second component; and
determining, using the second component, an action for the vehicle to perform,
wherein the first component requires fewer computational resources than the second component.

7. The one or more non-transitory computer-readable media of claim 6, the operations further comprising:
determining an intersection location at which the candidate trajectory associated with the vehicle intersects with the predicted trajectory associated with the object;
determining a first time that the vehicle is predicted to navigate through the intersection location;
determining a second time that the object is predicted to navigate through the intersection location; and
determining a time difference between the first time and the second time,
wherein determining the relevance score is based at least in part on the time difference.

8. The one or more non-transitory computer-readable media of claim 7, wherein determining the location comprises:
analyzing the candidate trajectory using time steps to determine candidate future locations associated with the vehicle;
analyzing the predicted trajectory using the time steps to determine predicted future locations; and
determining that a candidate future location from the candidate future locations and a predicted future location from the predicted future locations intersect at the intersection location.

9. The one or more non-transitory computer-readable media of claim 6, wherein the object is a first object, the predicted trajectory is a first predicted trajectory, the direct interaction is a first direct interaction, and the relevance score is a first relevance score, and wherein the operations further comprise:
determining, based at least in part on the sensor data, a second predicted trajectory associated with a second object;
determining, based at least in part on the second predicted trajectory and the candidate trajectory, that there is a second direct interaction between the vehicle and the second object;
determining, based at least in part on the second direct interaction, a second relevance score associated with the second object; and
determining that the first relevance score is greater than the second relevance score,
wherein inputting the object data representing the object into the second component comprises inputting the object data representing the first object and is based at least in part on the first relevance score being greater than the second relevance score.

10. The one or more non-transitory computer-readable media of claim 6, the operations further comprising:
determining a plurality of relevance scores associated with a plurality of objects; and
determining, based at least in part on the plurality of relevance scores, a threshold number of the plurality of objects, wherein the threshold number of the plurality of objects includes at least the object.

11. The one or more non-transitory computer-readable media of claim 6, wherein determining that there is the direct interaction between the vehicle and the object comprises:
determining, based at least in part on the candidate trajectory and the predicted trajectory, a distance between the vehicle and the object at a future time; and
determining that the distance is less than a threshold distance.

12. The one or more non-transitory computer-readable media of claim 11, the operations further comprising determining the threshold distance based at least in part on at least one of:
a candidate velocity associated with the vehicle;
a predicted velocity associated with the object; or
a classification associated with the object.

13. The one or more non-transitory computer-readable media of claim 6, wherein the object is a first object, the predicted trajectory is a first predicted trajectory, the potential interaction is a first potential interaction, the relevance score is a first relevance score, and the object data is first object data, and wherein the operations further comprise:
determining, based at least in part on the sensor data, a second predicted trajectory associated with a second object;
determining, based at least in part on the first predicted trajectory associated with the first object and the second predicted trajectory associated with the second object, a second potential interaction between the first object and the second object;
determining, based at least in part on the second potential interaction, a second relevance score associated with the second object; and
based at least in part on the second relevance score, inputting second object data associated with the second object into the second component.

14. The one or more non-transitory computer-readable media of claim 6, wherein the object is a first object, the predicted trajectory is a first predicted trajectory, the direct interaction is a first direct interaction, the relevance score is a first relevance score, and the object data is first object data, and wherein the operations further comprise:
determining, based at least in part on the sensor data, a second predicted trajectory associated with a second object;
determining, based at least in part on the second predicted trajectory and the candidate trajectory, that there is a second direct interaction between the vehicle and the second object;
determining, based at least in part on the second direct interaction, a second relevance score associated with the second object; and
based at least in part on the second relevance score, refraining from inputting second object data associated with the second object into a planner component.

15. The one or more non-transitory computer-readable media of claim 6, wherein the candidate trajectory is a first candidate trajectory, the direct interaction is a first direct interaction, and the relevance score is a first relevance score, and wherein the operations further comprise:
determining, using the first component and based at least in part on map data and the sensor data, a second candidate trajectory associated with the vehicle;
determining, based at least in part on the predicted trajectory and the second candidate trajectory, that there is a second direct interaction between the vehicle and the object;
determining, based at least in part on the second direct interaction, a second relevance score associated with the object;
determining that the first relevance score is greater than the second relevance score; and
associating the first relevance score with the object based at least in part on the first relevance score being greater than the second relevance score.

16. The one or more non-transitory computer-readable media of claim 15, wherein the object is a first object, and wherein the operations further comprise:
determining that a second object is located along the first candidate trajectory;
determining, based at least in part on a velocity associated with the second object, a first candidate velocity associated with the first candidate trajectory; and
determining, based at least in part on a speed limit, a second candidate velocity associated with the second candidate trajectory.

17. The one or more non-transitory computer-readable media of claim 6, wherein determining the relevance score associated with the object comprises:
determining a location at which the candidate trajectory associated with the vehicle intersects with the predicted trajectory associated with the object;

determining a first time that the vehicle is predicted to navigate through the location;
determining a second time that the object is predicted to navigate through the location;
determining a time difference between the first time and the second time; and
determining the relevance score based at least in part on the time difference.

18. A method comprising:

receiving sensor data from a sensor associated with a vehicle;
determining, based at least in part on the sensor data, a predicted trajectory associated with an object;
determining, based at least in part on the sensor data, an additional predicted trajectory associated with an additional object;
determining, using a first component and based at least in part on map data, a candidate trajectory associated with the vehicle;
determining, based at least in part on the predicted trajectory, the additional predicted trajectory, and the candidate trajectory, that there is one or more of a direct interaction between the vehicle and the object or a potential interaction between the object and the additional object;
determining, based at least in part on the one or more of the direct interaction or the indirect interaction, a relevance score associated with the object;
based at least in part on the relevance score, inputting object data representing the object into a second component; and
determining, using the second component, an action for the vehicle to perform.

19. The method of claim 18, further comprising:

determining a location at which the candidate trajectory associated with the vehicle intersects with the predicted trajectory associated with the object;
determining a first time that the vehicle is predicted to navigate through the location;
determining a second time that the object is predicted to navigate through the location; and
determining a time difference between the first time and the second time,
wherein determining the relevance score is based at least in part on the time difference.

20. The method of claim 18, further comprising:

determining a plurality of relevance scores associated with a plurality of objects; and
determining, based at least in part on the plurality of relevance scores, a threshold number of the plurality of objects, wherein the threshold number of the plurality of objects includes at least the object.

* * * * *